United States Patent
Konet et al.

(10) Patent No.: US 9,482,544 B1
(45) Date of Patent: Nov. 1, 2016

(54) ELECTRIC VEHICLE EFFICIENCY PROFILE MANAGEMENT

(71) Applicant: Nissan North America, Inc., Franklin, TN (US)

(72) Inventors: Heather Konet, Canton, MI (US); Eloi Taha, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 14 days.

(21) Appl. No.: 14/742,186

(22) Filed: Jun. 17, 2015

(51) Int. Cl.
*G01C 21/34* (2006.01)
*G01C 21/20* (2006.01)

(52) U.S. Cl.
CPC .......... *G01C 21/3469* (2013.01); *G01C 21/20* (2013.01); *G01C 21/34* (2013.01)

(58) Field of Classification Search
CPC .... G01G 1/00; G01C 21/3469; G01C 21/34; G01C 21/20; B60L 2250/16; B60L 2260/54; B60W 11/1861; B60W 2250/402
See application file for complete search history.

(56) References Cited

U.S. PATENT DOCUMENTS

| | | | |
|---|---|---|---|
| 5,487,002 A | 1/1996 | Diller et al. | |
| 5,854,987 A * | 12/1998 | Sekine | B62D 1/28 180/443 |
| 5,913,917 A | 6/1999 | Murphy | |
| 5,928,294 A * | 7/1999 | Zelinkovsky | G05D 1/0265 180/168 |
| 7,865,298 B2 | 1/2011 | Macneille et al. | |
| 8,774,995 B2 | 7/2014 | Ishibashi | |
| 2010/0049389 A1 | 2/2010 | Ando | |
| 2010/0286909 A1 | 11/2010 | Tate, Jr. et al. | |
| 2012/0191279 A1 | 7/2012 | Wippler | |
| 2013/0151046 A1 | 6/2013 | Choi et al. | |
| 2013/0238180 A1 | 9/2013 | Bold et al. | |
| 2014/0047347 A1 * | 2/2014 | Mohn | G08G 1/00 715/738 |
| 2014/0074329 A1 | 3/2014 | Yang et al. | |
| 2015/0012170 A1 | 1/2015 | Pita-Gil et al. | |

FOREIGN PATENT DOCUMENTS

WO 2013117545 8/2013

* cited by examiner

*Primary Examiner* — Thomas Tarcza
*Assistant Examiner* — Edward J Pipala
(74) *Attorney, Agent, or Firm* — Young Basile Hanlon & MacFarlane, P.C.

(57) ABSTRACT

Electric vehicle efficiency profile management may include storing user-specific efficiency information associated with an electric vehicle and a current user of a portable electronic computing and communication device in response to detecting, by the portable electronic computing and communication device, a direct electronic communication link with an electric vehicle, and, in response to detecting, by the portable electronic computing and communication device, a disconnection of the direct electronic communication link, determining a current efficiency value, and storing a user-specific efficiency profile incorporating the current efficiency value.

22 Claims, 17 Drawing Sheets

ELECTRIC VEHICLE EFFICIENCY PROFILE MANAGEMENT

TECHNICAL FIELD

This disclosure relates to managing efficiency profiles for vehicle range prediction and navigation routing.

BACKGROUND

The rate of power utilization for an electric vehicle may depend on multiple factors, such as the vehicle, driving habits of the driver, and the ambient temperature. Accordingly, a method and apparatus for electric vehicle efficiency profile management may be advantageous.

SUMMARY

Disclosed herein are aspects, features, elements, implementations, and embodiments of electric vehicle efficiency profile management.

An aspect of the disclosed embodiments is a method for electric vehicle efficiency profile management. Electric vehicle efficiency profile management may include in response to detecting, by a portable electronic computing and communication device, a first direct electronic communication link between the portable electronic computing and communication device and an electric vehicle, storing, in a memory of the portable electronic computing and communication device, first user-specific efficiency information associated with the electric vehicle and associated with a current user of the portable electronic computing and communication device. Storing the first user-specific efficiency information may include identifying a first current location, and storing one or more of a user identifier indicating the current user, a vehicle identifier indicating the electric vehicle, the first current location, first current vehicle state information, a first current ambient temperature, or first current temporal information. Electric vehicle efficiency profile management may include in response to detecting, by the portable electronic computing and communication device, a disconnection of the first direct electronic communication link, storing, in the memory, second user-specific efficiency information associated with the current user and associated with the electric vehicle. Storing the second user-specific efficiency information may include identifying a second current location, determining a current efficiency value based on the first user-specific efficiency information and the second user-specific efficiency information, and storing a user-specific efficiency profile incorporating the current efficiency value.

Another aspect of the disclosed embodiments is a method for electric vehicle efficiency profile management. Electric vehicle efficiency profile management may include in response to detecting, by a portable electronic computing and communication device, a first direct electronic communication link between the portable electronic computing and communication device and an electric vehicle, storing, in a memory of the portable electronic computing and communication device, first user-specific efficiency information associated with the electric vehicle and associated with a current user of the portable electronic computing and communication device. Storing the first user-specific efficiency information may include identifying a first current location, wherein the first current location indicates a current location of the portable electronic computing and communication device, temporally proximate to detecting the first direct electronic communication link, identifying first current vehicle state information, the first current vehicle state information indicating one or more of a first current state of charge of a battery of the electric vehicle or first current odometry information for the electric vehicle, temporally proximate to detecting the first direct electronic communication link, identifying a first current ambient temperature, wherein the first current ambient temperature indicates a current ambient temperature for the first current location, temporally proximate to detecting the first direct electronic communication link, and storing one or more of a user identifier indicating the current user, a vehicle identifier indicating the electric vehicle, the first current location, the first current vehicle state information, the first current ambient temperature, or first current temporal information. Electric vehicle efficiency profile management may include in response to detecting, by the portable electronic computing and communication device, a disconnection of the first direct electronic communication link, storing, in the memory, second user-specific efficiency information associated with the current user and associated with the electric vehicle. Storing the second user-specific efficiency information may include identifying a second current location, wherein the second current location indicates a current location of the portable electronic computing and communication device, temporally proximate to detecting the disconnection, identifying second current vehicle state information, the second current vehicle state information indicating one or more of a second current state of charge of the battery or second current odometry information for the electric vehicle, temporally proximate to detecting the disconnection, determining a current efficiency value based on the first user-specific efficiency information and the second user-specific efficiency information, storing one or more of the user identifier indicating the current user, the vehicle identifier identifying the electric vehicle, the second current location, the second current vehicle state information, or second current temporal information, and storing a user-specific efficiency profile incorporating the current efficiency value.

Another aspect of the disclosed embodiments is a method for electric vehicle efficiency profile management. Electric vehicle efficiency profile management may include in response to detecting, by a portable electronic computing and communication device, a first direct electronic communication link between the portable electronic computing and communication device and an electric vehicle, storing, in a memory of the portable electronic computing and communication device, first user-specific efficiency information associated with the electric vehicle and associated with a current user of the portable electronic computing and communication device. Storing the first user-specific efficiency information may include identifying a first current location, and storing one or more of a user identifier indicating the current user, a vehicle identifier indicating the electric vehicle, the first current location, first current vehicle state information, a first current ambient temperature, or first current temporal information. Electric vehicle efficiency profile management may include in response to detecting, by the portable electronic computing and communication device, a disconnection of the first direct electronic communication link, storing, in the memory, second user-specific efficiency information associated with the current user and associated with the electric vehicle. Storing the second user-specific efficiency information may include identifying a second current location, determining a current efficiency value based on the first user-specific efficiency information and the second user-specific efficiency information, identifying, from a user-specific efficiency profile associated with the user and the electric vehicle, a user-specific aggregate efficiency value corresponding to the current ambient temperature, generating an updated user-specific aggregate efficiency value based on the user-specific aggregate efficiency value and the current efficiency value, updating the user-specific efficiency profile to include the updated user-specific aggregate efficiency value, and storing the user-specific efficiency profile.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
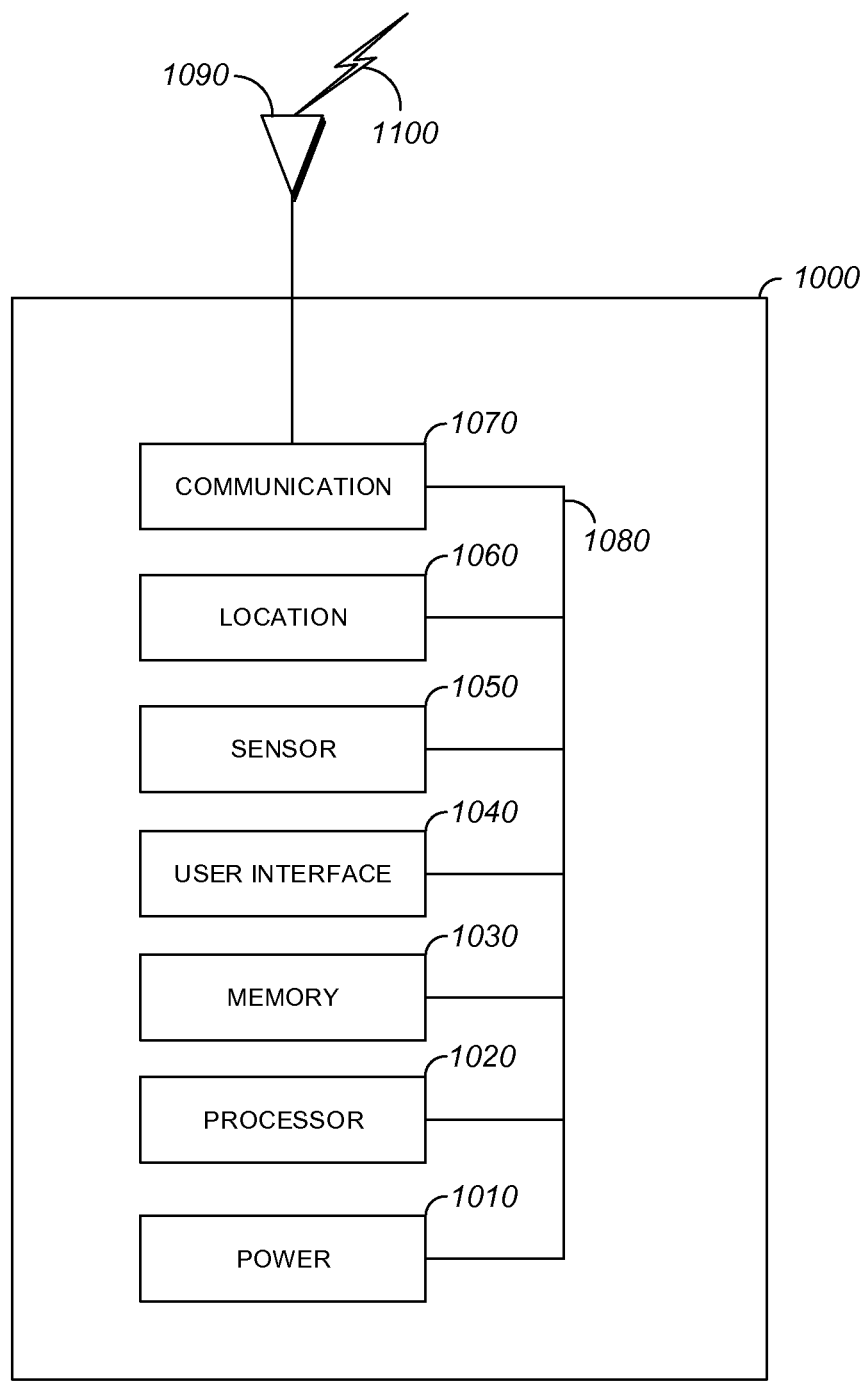
FIG. 1 is a diagram of an example of a computing and communication device 1000 in which aspects, features, and elements disclosed herein may be implemented.

An electric vehicle may travel from a point of origin to a destination in a vehicle transportation network using power stored in a battery of the electric vehicle. Whether and how to operate an electric vehicle may depend on accurate determinations regarding the operating range of the electric vehicle. For example, a driver may determine whether to use an electric vehicle to travel from the origin to the destination based on a determination of the expected operational range of the electric vehicle after traversing the vehicle transportation network from the origin to the destination. However, in some implementations, a determination of the expected operational range of the electric vehicle after traversing the vehicle transportation network from the origin to the destination may be unavailable prior to traversing the vehicle transportation network from the origin to the destination.

Furthermore, the efficiency of power utilization for operating an electric vehicle may be affected by factors, such as the characteristics of the electric vehicle, the driving behavior of the driver of the vehicle, and operating conditions for driving the electric vehicle, such as the ambient temperature. However, in some implementations, determinations of the expected operational range of the electric vehicle after traversing the vehicle transportation network from the origin to the destination may be inaccurate because one or more of these factors is ignored.

Implementations of electric vehicle range prediction may include accurately determining the expected operational range for an electric vehicle after traversing the vehicle transportation network from the origin to the destination prior to traversing the vehicle transportation network from the origin to the destination based on the characteristics of the electric vehicle, the driving behavior of the driver, and the expected ambient temperature. Furthermore, electric vehicle range prediction may be performed by a portable electronic computing and communication device independent of the electric vehicle. Implementations of electric vehicle efficiency profile management may include generating and maintaining user-specific efficiency information and user-specific efficiency profiles for use in electric vehicle range prediction.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a computing and communication device 1000 in which aspects, features, and elements disclosed herein may be implemented. In some embodiments, a computing and communication device 1000 may include a power unit 1010, a processor 1020, a memory 1030, a user interface 1040, a sensor 1050, a location unit 1060, an electronic communication unit 1070, an internal communication interface 1080, an external communication interface 1090, or any other element or combination of elements of a computing and communication device. Although shown as a single unit, any one or more elements of the computing and communication device 1000 may be integrated into any number of separate physical units. For example, the user interface 1040 and processor 1020 may be integrated in a first physical unit and the memory 1030 may be integrated in a second physical unit. Although shown as separate elements, the power unit 1010, the processor 1020, the memory 1030, the user interface 1040, the sensor 1050, the location unit 1060, the electronic communication unit 1070, the external communication interface 1090, the internal communication interface 1080, or any combination thereof may be integrated in one or more electronic units, circuits, or chips.

In some embodiments, the power unit 1010 may include a wired power source, a power scavenger, a potential energy unit, or a combination thereof. The power unit 1010 may be any device or combination of devices operative to provide energy, such as electrical energy. In some embodiments, the power unit 1010 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy. The processor 1020, the memory 1030, the user interface 1040, the sensor 1050, the location unit 1060, the electronic communication unit 1070, the internal communication interface 1080, the external communication interface 1090, or any combination thereof, may be operatively coupled with the power source 1010.

In some embodiments, the processor 1020 may include any device or combination of devices capable of manipulating or processing a signal or other information now-existing or hereafter developed, including optical processors, quantum processors, molecular processors, or a combination thereof. For example, the processor 1020 may include one or more special purpose processors, one or more application processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1020 may be operatively coupled with the power unit 1010, the memory 1030, the user interface 1040, the sensor 1050, the location unit 1060, the electronic communication unit 1070, the external communication interface 1090, the internal communication interface 1080, or any combination thereof. For example, the processor 1020 may be operatively couple with the memory 1030 via the internal communication interface 1080.

The memory 1030 may include any tangible non-transitory computer-usable or computer-readable medium, capable of, for example, containing, storing, communicating, or transporting machine readable instructions, or any information associated therewith, for use by or in connection with the processor 1020. The memory 1030 may be, for example, one or more solid state drives, one or more memory cards, one or more removable media, one or more read only memories, one or more random access memories, one or more disks, including a hard disk, a floppy disk, an optical disk, a magnetic or optical card, a low power double data rate (LPDDR) memory unit, or any type of non-transitory media suitable for storing electronic information, or any combination thereof.

The user interface 1040 may include any unit capable of interfacing with a person, such as a virtual or physical keypad, a touchpad, a display, a touch display, a speaker, a microphone, a video camera, a sensor, a printer, or any combination thereof. The user interface 1040 may be operatively coupled with the processor 1020, as shown, or with any other element of the computing and communication device 1000. Although shown as a single unit, the user interface 1040 may include one or more physical units. For example, the user interface 1040 may include an audio interface for performing audio communication with a person, and a touch display for performing visual and touch based communication with the person.

The sensor 1050 may include one or more sensors, such as an array of sensors, which may be operable to provide information to the computing and communication device 1000. The sensors 1050 can include, for example, a speed sensor, acceleration sensors, biometric sensors, temperature sensors, or any sensor, or combination of sensors, operable to report information regarding some aspect of the current dynamic situation of the computing and communication device 1000.

The location unit 1060 may determine geolocation information, such as longitude, latitude, elevation, direction of travel, or speed, of the computing and communication device 1000. For example, the location unit 1060 may include a global positioning system (GPS) unit, a radio triangulation unit, or a combination thereof. The location unit 1060 can be used to obtain information that represents, for example, a current heading of the computing and communication device 1000, a current position of the computing and communication device 1000 in two or three dimensions, a current angular orientation of the computing and communication device 1000, or a combination thereof.

The electronic communication unit 1070 may be configured to transmit or receive signals via a wired or wireless medium 1100, such as via the external communication interface 1090. Although not explicitly shown in FIG. 1, the electronic communication unit 1070 may be configured to transmit, receive, or both via any wired or wireless communication medium, such as radio frequency (RF), ultra violet (UV), visible light, fiber optic, wire line, or a combination thereof. Although FIG. 1 shows a single electronic communication unit 1070 and a single external communication interface 1090, any number of communication units and any number of communication interfaces may be used.

The internal communication interface 1080 may be configured to transmit and receive signals between elements of the computing and communication device 1000. Although shown as a single unit, the internal communication interface 1080 may include multiple connected or independent elements. For example the internal communication interface 1080 may include bus, such as a system bus, a peripheral bus, a local bus, or any other component configured for communication between one or more elements of the computing and communication device 1000.

The external communication interface 1090 may be a wireless antenna, as shown, a wired communication port, an optical communication port, or any other wired or wireless unit capable of interfacing with a wired or wireless electronic communication medium 1100. Although FIG. 1 shows the external communication interface 1090 communicating via a single communication link, a communication interface may be configured to communicate via multiple communication links. Although FIG. 1 shows a single external communication interface 1090, an electric vehicle may include any number of communication interfaces.

In some embodiments, a computing and communication device 1000 may be implemented as a portable electronic computing and communication device, such as a mobile device, a user equipment, a wireless transmit/receive unit, a mobile station, a mobile subscriber unit, a pager, a cellular telephone, a smartphone, a personal digital assistant (PDA), a portable computer, or any other type of user device capable of operating in a mobile environment. In some embodiments, a computing and communication device 1000 may be implemented in a vehicle. For example, a computing and communication device 1000 may be implemented as a controller in an electric vehicle as shown in FIG. 2.

Figure 2:
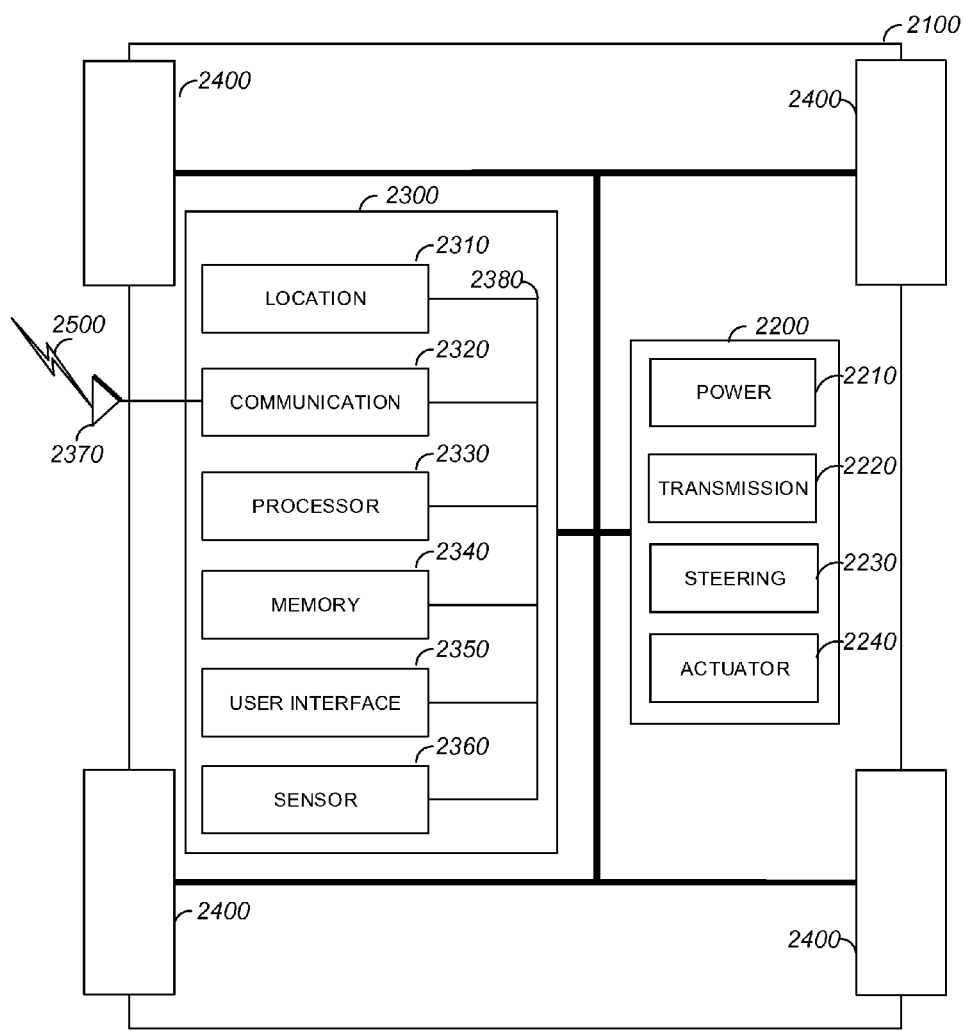
FIG. 2 is a diagram of an example of an electric vehicle 2000 in which the aspects, features, and elements disclosed herein may be implemented.

FIG. 2 is a diagram of an example of an electric vehicle 2000 in which the aspects, features, and elements disclosed herein may be implemented. In some embodiments, an electric vehicle 2000 may include a chassis 2100, a powertrain 2200, a controller 2300, wheels 2400, or any other element or combination of elements of an electric vehicle. Although the electric vehicle 2000 is shown as including four wheels 2400 for simplicity, any other propulsion device or devices, such as a propeller or tread, may be used. In FIG. 2, the lines interconnecting elements, such as the powertrain 2200, the controller 2300, and the wheels 2400, indicate that information, such as data or control signals, power, such as electrical power or torque, or both information and power, may be communicated between the respective elements. For example, the controller 2300 may receive power from the powertrain 2200 and may communicate with the powertrain 2200, the wheels 2400, or both, to control the electric vehicle 2000, which may include accelerating, decelerating, steering, or otherwise controlling the electric vehicle 2000.

The powertrain 2200 may include a power source 2210, a transmission 2220, a steering unit 2230, an actuator 2240, or any other element or combination of elements of a powertrain, such as a suspension, a drive shaft, axels, or an exhaust system. Although shown separately, the wheels 2400 may be included in the powertrain 2200.

The power source 2210 may include an engine, a battery, or a combination thereof. The power source 2210 may be any device or combination of devices operative to provide energy, such as electrical energy, thermal energy, or kinetic energy. For example, the power source 2210 may include an engine, such as an electric motor, and may be operative to provide kinetic energy as a motive force to one or more of the wheels 2400. In some embodiments, the power source 1400 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy. In some implementations, the power source 2210 may include an internal combustion engine.

The transmission 2220 may receive energy, such as kinetic energy, from the power source 2210, and may transmit the energy to the wheels 2400 to provide a motive force. The transmission 2220 may be controlled by the control unit 2300, the actuator 2240, or both. The steering unit 2230 may be controlled by the control unit 2300, the actuator 2240, or both and may control the wheels 2400 to steer the electric vehicle. The vehicle actuator 2240 may receive signals from the controller 2300 and may actuate or control the power source 2210, the transmission 2220, the steering unit 2230, or any combination thereof to operate the electric vehicle 2000.

In some embodiments, the controller 2300 may include a computing and communication device, such as the computing and communication device 1000 shown in FIG. 1. For example, the controller 2300 may include a location unit 2310, an electronic communication unit 2320, a processor 2330, a memory 2340, a user interface 2350, a sensor 2360, an electronic communication interface 2370, or any combination thereof. Although shown as a single unit, any one or more elements of the controller 2300 may be integrated into any number of separate physical units. For example, the user interface 2350 and processor 2330 may be integrated in a first physical unit and the memory 2340 may be integrated in a second physical unit. Although not shown in FIG. 2, the controller 2300 may include a power source, such as a battery. Although shown as separate elements, the location unit 2310, the electronic communication unit 2320, the processor 2330, the memory 2340, the user interface 2350, the sensor 2360, the electronic communication interface 2370, or any combination thereof may be integrated in one or more electronic units, circuits, or chips.

In some embodiments, the processor 2330, which may be similar to the processor 1020 shown in FIG. 1, may be operatively coupled with the location unit 2310, the memory 2340, the electronic communication interface 2370, the electronic communication unit 2320, the user interface 2350, the sensor 2360, the powertrain 2200, or any combination thereof. For example, the processor may be operatively couple with the memory 2340 via a communication bus 2380.

The location unit 2310, which may be similar to the location unit 1060 shown in FIG. 1, may determine geolocation information, such as longitude, latitude, elevation, direction of travel, or speed, of the electric vehicle 2000. For example, the location unit may include a global positioning system (GPS) unit, a radio triangulation unit, or a combination thereof. The location unit 2310 can be used to obtain information that represents, for example, a current heading of the electric vehicle 2000, a current position of the electric vehicle 2000 in two or three dimensions, a current angular orientation of the electric vehicle 2000, or a combination thereof.

The sensor 2360, which may be similar to the sensor 1050 shown in FIG. 1, may include one or more sensors, such as an array of sensors, which may be operable to provide information that may be used to control the electric vehicle. The sensors 1360 may provide information regarding current operating characteristics of the vehicle. The sensors 1360 can include, for example, a speed sensor, acceleration sensors, a steering angle sensor, traction-related sensors, braking-related sensors, or any sensor, or combination of sensors, that is operable to report information regarding some aspect of the current dynamic situation of the electric vehicle 2000.

In some embodiments, the sensors 2360 may include sensors that are operable to obtain information regarding the physical environment surrounding the electric vehicle 2000. For example, one or more sensors may detect road geometry and obstacles, such as fixed obstacles, vehicles, and pedestrians. In some embodiments, the sensors 2360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 2360 and the location unit 2310 may be combined.

In some embodiments, the electronic communication unit 2320 may be similar to the communication unit 1070 shown in FIG. 1. In some embodiments, the memory 2340 may be similar to the memory 1030 shown in FIG. 1. In some embodiments, the user interface 2350 may be similar to the user interface 1040 shown in FIG. 1. In some embodiments, the electronic communication interface 2370 may be similar to the external communication interface 1090 shown in FIG. 1. For example, the electronic communication unit 2320 may be configured to transmit or receive signals via a wired or wireless medium 2500, such as via the electronic communication interface 2370. Although not explicitly shown in FIG. 2, the electronic communication unit 2320 may be configured to transmit, receive, or both via any wired or wireless communication medium, such as radio frequency, ultra violet, visible light, fiber optic, wire line, or a combination thereof. Although FIG. 2 shows a single electronic communication unit 2320 and a single electronic communication interface 2370, any number of communication units and any number of communication interfaces may be used.

Although not shown separately, in some embodiments, the electric vehicle 2000 may include a trajectory controller. For example, the controller 2300 may include the trajectory controller. The trajectory controller may be operable to obtain information describing a current state of the electric vehicle 2000 and a rout planned for the electric vehicle 2000, and, based on this information, to determine and optimize a trajectory for the electric vehicle 2000. In some embodiments, the trajectory controller may output signals operable to control the electric vehicle 2000 such that the electric vehicle 2000 follows the trajectory that is determined by the trajectory controller. For example, the output of the trajectory controller can be an optimized trajectory that may be supplied to the powertrain 2200, the wheels 2400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 2400 may be a steered wheel, which may be pivoted to a steering angle under control of the steering unit 2230, a propelled wheel, which may be torqued to propel the electric vehicle 2000 under control of the transmission 2220, or a steered and propelled wheel that may steer and propel the electric vehicle 2000.

Although not shown in FIG. 2, an electric vehicle may include units, or elements not shown in FIG. 2, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 3:
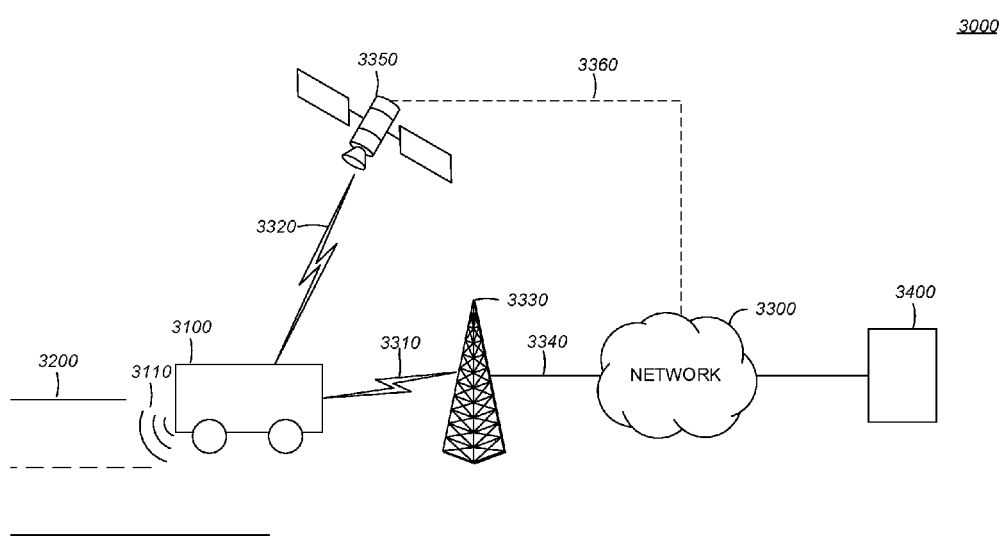
FIG. 3 is a diagram of an example of a portion of a vehicle transportation and communication system in which the aspects, features, and elements disclosed herein may be implemented.

FIG. 3 is a diagram of an example of a portion of a vehicle transportation and communication system in which the aspects, features, and elements disclosed herein may be implemented. The vehicle transportation and communication system 3000 may include one or more electric vehicles 3100, such as the electric vehicle 2000 shown in FIG. 2, which may travel via one or more portions of one or more vehicle transportation networks 3200, and may communicate via one or more electronic communication networks 3300. Although not explicitly shown in FIG. 2, an electric vehicle may traverse an area that is not expressly or completely included in a vehicle transportation network, such as an off-road area.

In some embodiments, the electronic communication network 3300 may be, for example, a multiple access system and may provide for communication, such as voice communication, data communication, video communication, messaging communication, or a combination thereof, between the electric vehicle 3100 and one or more communication devices 3400. For example, an electric vehicle 3100 may receive information, such as information representing the vehicle transportation network 3200, from a communication device 3400 via the network 3300.

In some embodiments, an electric vehicle 3100 may communicate via a wired communication link (not shown), a wireless communication link 3310/3320, or a combination of any number of wired or wireless communication links. For example, as shown, an electric vehicle 3100 may communicate via a terrestrial wireless communication link 3310, via a non-terrestrial wireless communication link 3320, or via a combination thereof. In some implementations, a terrestrial wireless communication link 3310 may include an Ethernet link, a serial link, a Bluetooth link, an infrared (IR) link, an ultraviolet (UV) link, or any link capable of providing for electronic communication.

In some embodiments, the electric vehicle 3100 may communicate with the communications network 3300 via an access point 3330. An access point 3330, which may include a computing device, may be configured to communicate with an electric vehicle 3100, with a communication network 3300, with one or more communication devices 3400, or with a combination thereof via wired or wireless communication links 3310/3340. For example, an access point 3330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the electric vehicle 3100 may communicate with the communications network 3300 via a satellite 3350, or other non-terrestrial communication device. A satellite 3350, which may include a computing device, may be configured to communicate with an electric vehicle 3100, with a communication network 3300, with one or more communication devices 3400, or with a combination thereof via one or more communication links 3320/3360. Although shown as a single unit, a satellite may include any number of interconnected elements.

An electronic communication network 3300 may be any type of network configured to provide for voice, data, or any other type of electronic communication. For example, the electronic communication network 3300 may include a local area network (LAN), a wide area network (WAN), a virtual private network (VPN), a mobile or cellular telephone network, the Internet, or any other electronic communication system. The electronic communication network 3300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, an electric vehicle 3100 may identify a portion or condition of the vehicle transportation network 3200. For example, the electric vehicle may include one or more on-vehicle sensors 3110, such as sensor 2360 shown in FIG. 2, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 3200.

In some embodiments, a vehicle transportation network 3200 may include one or more unnavigable areas, such as a building, one or more partially navigable areas, such as parking area, one or more navigable areas, such as roads, or a combination thereof. In some embodiments, an electric vehicle 3100 may traverse a portion or portions of the vehicle transportation network 3200.

Although not shown in FIG. 3, the vehicle transportation network 3200 may include one or more interchanges between one or more navigable, or partially navigable, areas. For example, a portion of the vehicle transportation network may include an interchange between a parking area and a road. In some embodiments, the parking area may include parking slots. A portion of the vehicle transportation network, such as a road may include one or more lanes, and may be associated with one or more directions of travel.

In some embodiments, a vehicle transportation network, or a portion thereof, such as the portion of the vehicle transportation network 3200 shown in FIG. 3, may be represented as vehicle transportation network information. For example, vehicle transportation network information may be expressed as a hierarchy of elements, such as markup language elements, which may be stored in a database or file. For simplicity, the Figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, or a combination thereof.

In some embodiments, a portion, or a combination of portions, of the vehicle transportation network may be identified as a point of interest or a destination. For example, the vehicle transportation network information may identify a building as a point of interest, an electric vehicle may identify the point of interest as a destination, and the electric vehicle may travel from an origin to the destination by traversing the vehicle transportation network.

In some embodiments, identifying a destination may include identifying a location for the destination, which may be a discrete uniquely identifiable geolocation. For example, the vehicle transportation network may include a defined location, such as a street address, a postal address, a vehicle transportation network address, a longitude and latitude, or a GPS address, for the destination. In some embodiments, a destination may be associated with one or more entrances. In some embodiments, the vehicle transportation network information may include defined or predicted entrance location information, such as information identifying a geolocation of an entrance associated with a destination. In some embodiments, a destination, such as a building may be associated with a parking area. For example, the vehicle transportation network information may include defined parking area information indicating that one or more parking areas are associated with a destination.

In some embodiments, the vehicle transportation network may be associated with, or may include, a pedestrian transportation network, such as a pedestrian walkway. In some embodiments, a pedestrian transportation network, or a portion thereof may be represented as pedestrian transportation network information. In some embodiments, the vehicle transportation network information may include pedestrian transportation network information. A pedestrian transportation network may include pedestrian navigable areas. A pedestrian navigable area, such as a pedestrian walkway or a sidewalk, may correspond with a non-navigable area of a vehicle transportation network. In some embodiments, a pedestrian navigable area, such as a pedestrian crosswalk, may correspond with a navigable area, or a partially navigable area, of a vehicle transportation network.

In some embodiments, an electric vehicle 3100 may traverse a portion or portions of one or more vehicle transportation networks 3200 using information communicated via the network 3300, such as information representing the vehicle transportation network 3200, information identified by one or more on-vehicle sensors 3110, or a combination thereof.

Although, for simplicity, FIG. 3 shows one electric vehicle 3100, one vehicle transportation network 3200, one electronic communication network 3300, and one communication device 3400, any number of electric vehicles, networks, or computing devices may be used. In some embodiments, the vehicle transportation and communication system 3000 may include devices, units, or elements not shown in FIG. 3. Although the electric vehicle 3100 is shown as a single unit, an electric vehicle may include any number of interconnected elements.

Although the electric vehicle 3100 is shown communicating with the communication device 3400 via the network 3300, the electric vehicle 3100 may communicate with the communication device 3400 via any number of direct or indirect communication links. For example, the electric vehicle 3100 may communicate with the communication device 3400 via a direct communication link, such as a Bluetooth communication link.

Figure 4:
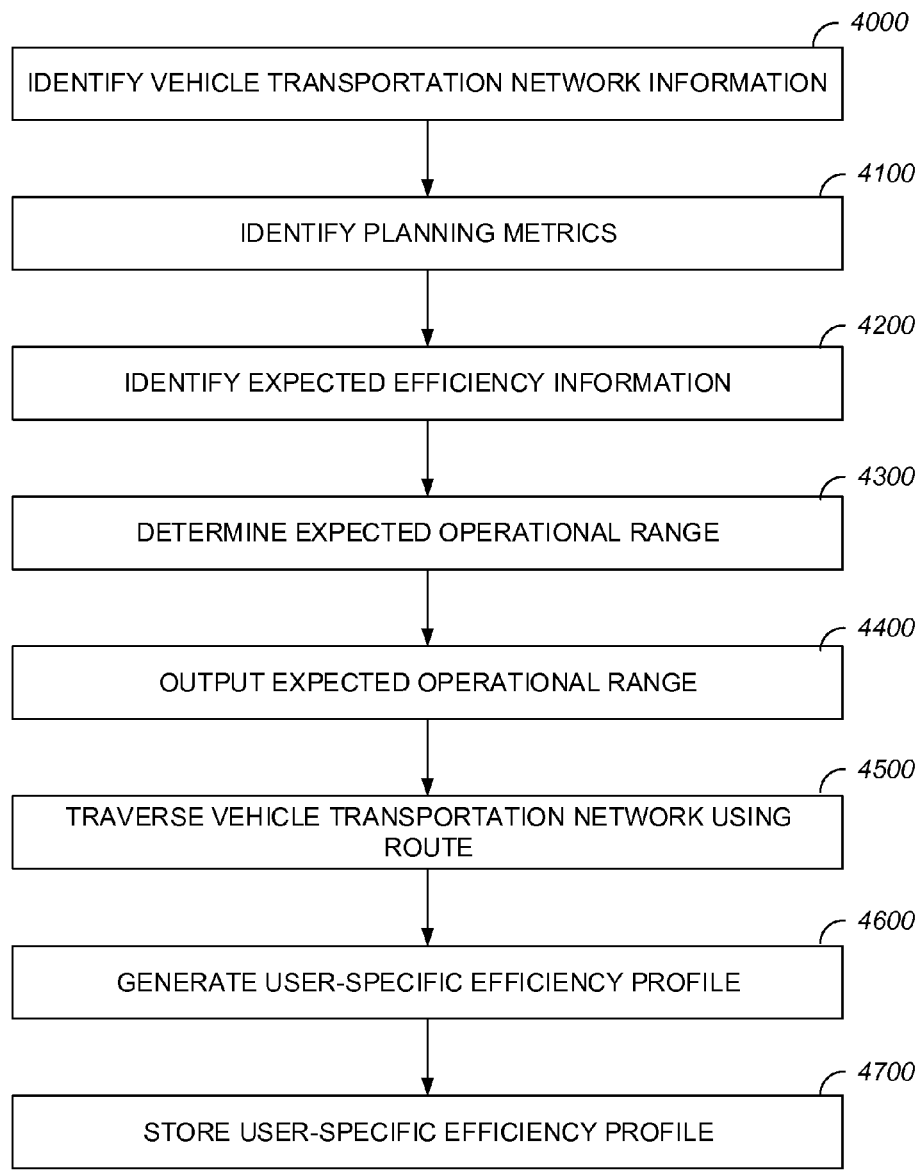
FIG. 4 is a diagram of a method of electric vehicle range prediction in accordance with this disclosure.

FIG. 4 is a diagram of a method of electric vehicle range prediction in accordance with this disclosure. Electric vehicle range prediction may include determining an expected operational range for an electric vehicle. The expected operational range may indicate an estimated or predicted operational range for the electric vehicle subsequent to performing defined vehicle operations, such as traversing the vehicle transportation network via one or more defined routes at defined times, and may be based on based on metrics, such as an expected state of charge of a battery of the electric vehicle, an expected ambient temperature at departure, the defined route, and an expected driving efficiency. For example, electric vehicle range prediction may include determining an expected operational range for an electric vehicle after commuting from home to work at a defined departure time in the morning and determining an expected operational range for the electric vehicle after commuting from work to home at a defined departure time in the evening.

Electric vehicle range prediction may be implemented in a portable electronic computing and communication device, such as the portable electronic computing and communication device 1000 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to perform electric vehicle range prediction. Implementations of electric vehicle range prediction may include identifying vehicle transportation network information at 4000, identifying planning metrics at 4100, identifying expected efficiency information at 4200, determining expected operational range information at 4300, outputting the expected operational range information at 4400, traversing the vehicle transportation network using a route at 4500, generating user-specific efficiency profile information at 4600, storing the user-specific efficiency profile information at 4700, or a combination thereof.

Figure 6:
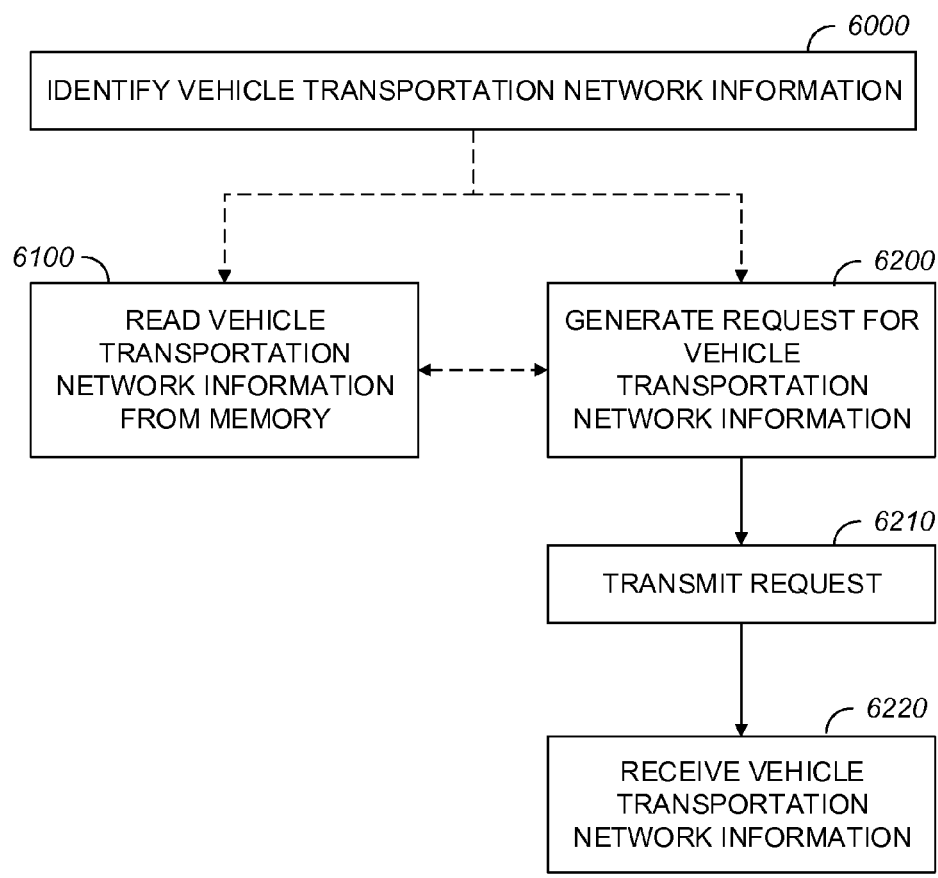
FIG. 6 is a diagram of a method of identifying vehicle transportation network information for electric vehicle range prediction in accordance with this disclosure.

In some embodiments, vehicle transportation network information may be identified at 4000. For example, a portable electronic computing and communication device, such as the portable electronic computing and communication device 1000 shown in FIG. 1, may read the vehicle transportation network information from a data storage unit, such as the memory 1030 shown in FIG. 1, or may receive the vehicle transportation network information from an external data source, such as the communicating device 3400 shown in FIG. 3, via a communication system, such as the electronic communication network 3300 shown in FIG. 3. In some embodiments, identifying the vehicle transportation network information may include transcoding or reformatting the vehicle transportation network information, storing the reformatted vehicle transportation network information, or both. In some embodiments, identifying vehicle transportation network information at 4000 may be omitted. For example, identifying vehicle transportation network information at 4000 may be omitted and identifying planning metrics at 4100 may include identifying vehicle transportation network information. In some embodiments, identifying vehicle transportation network information may be similar to identifying vehicle transportation network information as shown in FIG. 6.

Figure 5:
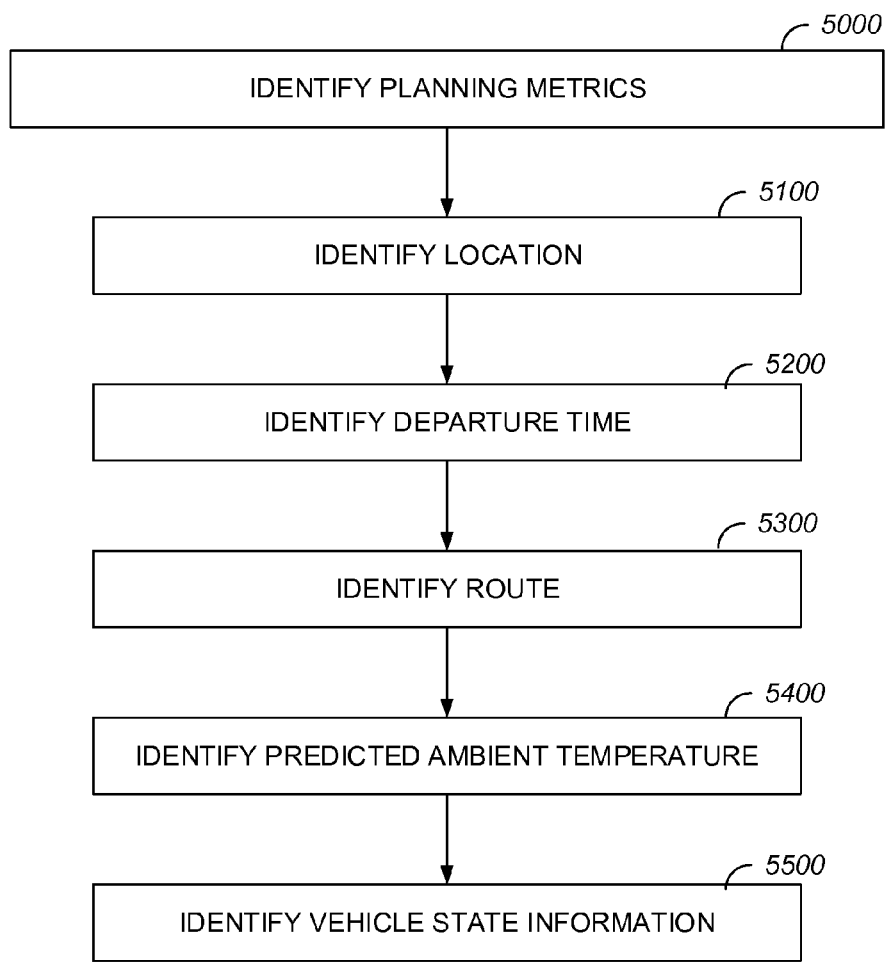
FIG. 5 is a diagram of a method of identifying planning metrics for electric vehicle range prediction in accordance with this disclosure.

In some embodiments, planning metrics may be identified at 4100. For example, the planning metrics may be identified by the portable electronic computing and communication device. In some embodiments, identifying the planning metrics at 4100 may include identifying location information, temporal information, route information, temperature information, vehicle state information, or a combination thereof. For example, identifying the planning metrics at 4100 may be similar to identifying the planning metrics as shown in FIG. 5, and may include identifying vehicle transportation network information, which may be similar to the vehicle transportation network information identification shown in FIG. 6, identifying location information, which may be similar to the location information identification shown in FIG. 7, identifying temporal information, which may be similar to the temporal information identification shown in FIG. 8, identifying route information, which may be similar to the route information identification shown in FIG. 9, identifying predicted ambient temperature information, which may be similar to the predicted ambient temperature information identification shown in FIG. 10, and identifying vehicle state information, which may be similar to the vehicle state information identification shown in FIG. 11.

In some embodiments, expected efficiency information may be identified at 4200. In some embodiments, identifying the expected efficiency information at 4200 may include identifying the expected efficiency information based on the planning metrics identified at 4100. In some embodiments, identifying expected efficiency information at 4200 may be similar to the expected efficiency information identification shown in FIG. 12.

In some embodiments, expected operational range information may be determined at 4300. In some embodiments, identifying the expected operational range information at 4300 may include identifying the expected operational range information based on the planning metrics identified at 4100 and the expected efficiency information identified at 4200. In some embodiments, identifying operational range efficiency information at 4300 may be similar to the expected operational range information identification shown in FIGS. 13-14.

Figure 18:
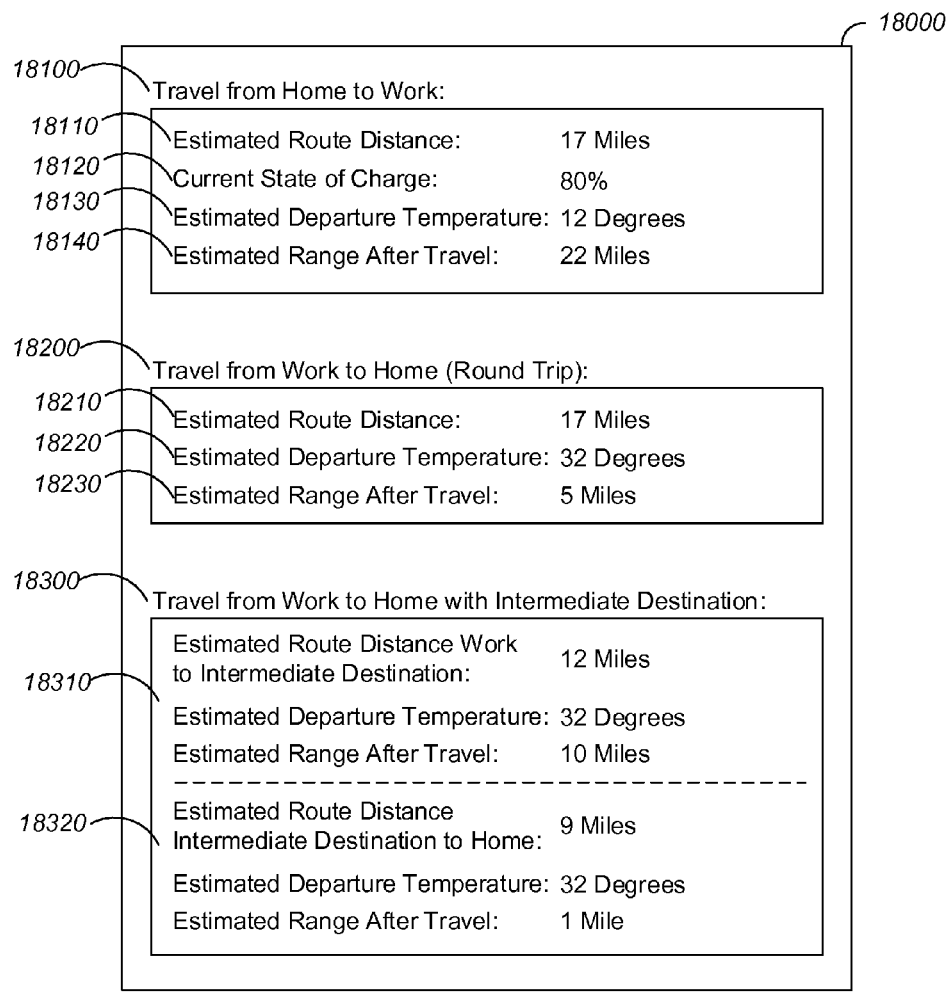
FIG. 18 is a diagram of an example of a user interface for electric vehicle range prediction in accordance with this disclosure.

In some embodiments, the expected operational range information may be output or stored at 4400. For example, outputting the expected operational range information at 4400 may include storing the expected operational range information in a memory of the portable electronic computing and communication device, such as the memory 1030 shown in FIG. 1, outputting the expected operational range information for presentation to a user of the portable electronic computing and communication device via a user-interface of the portable electronic computing and communication device, such as the user interface 1040 shown in FIG. 1, or a combination thereof. In some embodiments, outputting the expected operational range information for presentation to a user of the portable electronic computing and communication device via a user-interface of the portable electronic computing and communication device at 4400 may include outputting the expected operational range information for presentation as shown in FIG. 18.

In some embodiments, electric vehicle range prediction may include identifying planning metrics at 4100, identifying expected efficiency information at 4200, determining expected operational range information at 4300, and outputting the expected operational range information at 4400 for each of a sequence of trips. For example, electric vehicle range prediction may include identifying planning metrics at 4100, identifying expected efficiency information at 4200, determining expected operational range information at 4300, and outputting the expected operational range information at 4400 for a first trip from a defined home location to a defined work location, and identifying planning metrics at 4100, identifying expected efficiency information at 4200, determining expected operational range information at 4300, and outputting the expected operational range information at 4400 for a subsequent trip from the defined work location to the defined home location. In some embodiments, outputting the expected operational range information at 4400 may include outputting cumulative expected operational range information, which may indicate the expected operational range after a roundtrip, such as a trip from home to work and a subsequent trip from work to home.

In some embodiments, portions of electric vehicle range prediction, such as identifying planning metrics at 4100, identifying expected efficiency information at 4200, determining expected operational range information at 4300, and outputting the expected operational range information at 4400, may be performed before traversing the vehicle transportation network for the corresponding trip. For example, the expected operational range for the electric vehicle after traveling from home to work, and the expected operational range for the electric vehicle after subsequently traveling from work to home, may be determined before traveling from home to work. In some embodiments, an expected operational range for a subsequent trip may be determined after the preceding trip. For example, an expected operational range for traveling from work to home may be determined after traveling from home to work.

In some embodiments, the electric vehicle may traverse the vehicle transportation network at 4500. In some embodiments, the electric vehicle may traverse the vehicle transportation network at 4500 in accordance with the planning metrics identified at 4100. For example, the planning metrics identified at 4100 may indicate an origin, a destination, an expected departure time, a predicted ambient temperature at departure, a route from the origin to the destination, or a combination thereof, and the electric vehicle may traverse the vehicle transportation network from the origin to the destination using the route at the expected departure time.

Figure 15:
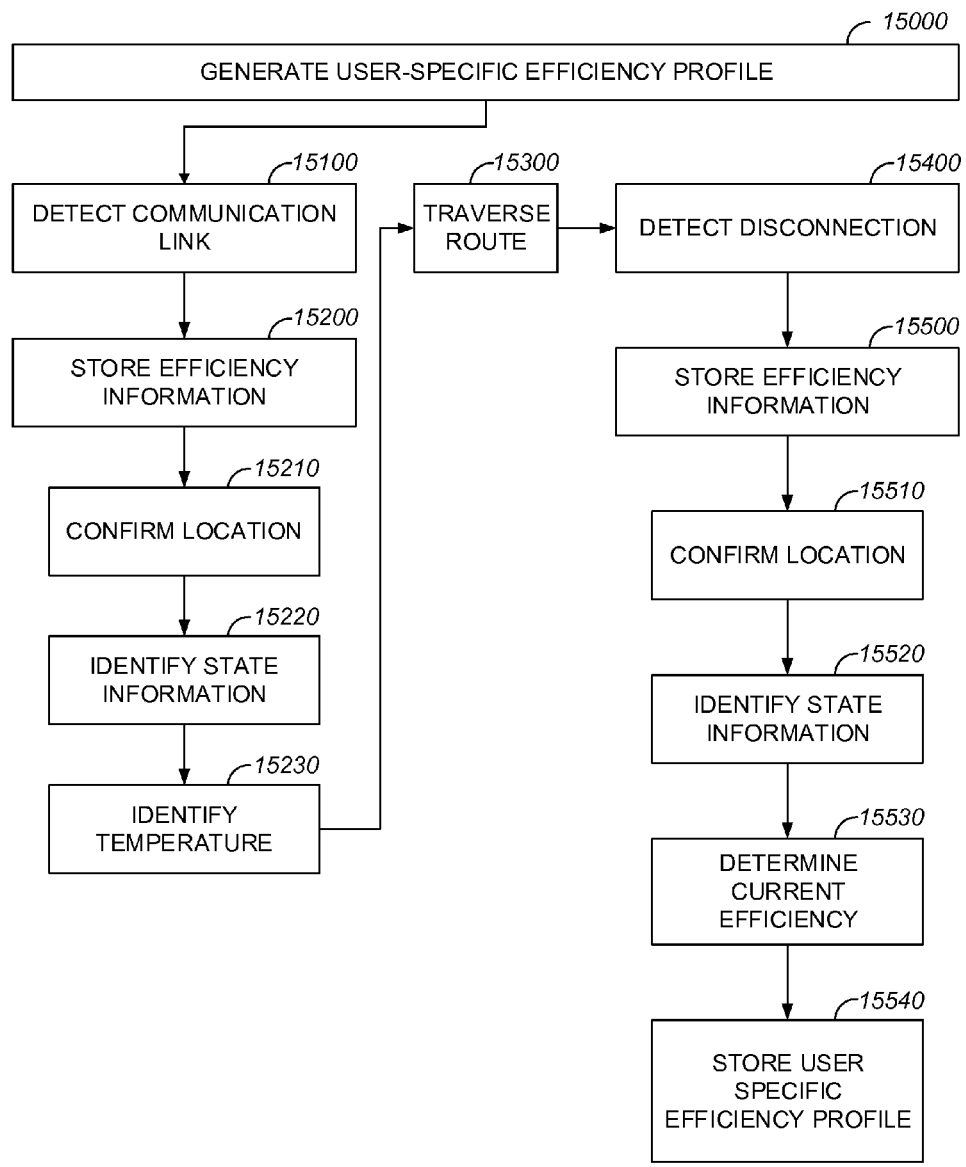
FIG. 15 is a diagram of an example of a method of generating a user-specific efficiency profile for electric vehicle range prediction in accordance with this disclosure.
Figure 16:
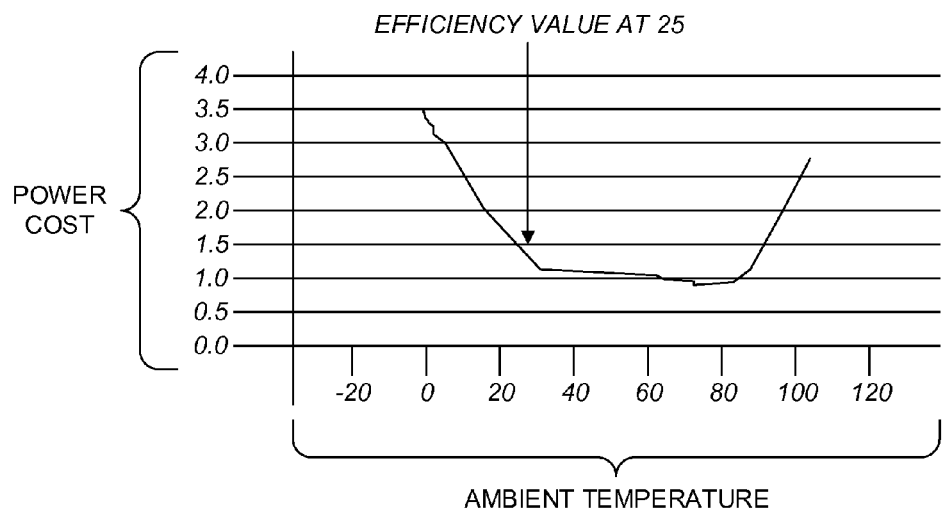
FIG. 16 is a diagram of an example of a defined efficiency profile for electric vehicle range prediction in accordance with this disclosure.
Figure 17:
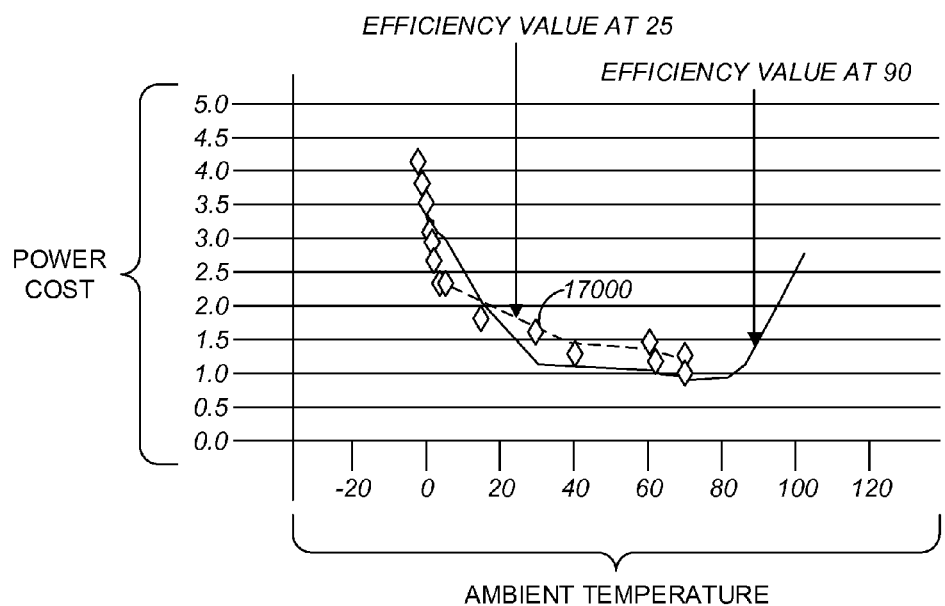
FIG. 17 is a diagram of an example of a user-specific efficiency profile for electric vehicle range prediction in accordance with this disclosure.

In some embodiments, user-specific efficiency profile information may be generated at 4600 and may be stored at 4700. For example, user-specific efficiency profile information may be generated at 4600 in response to traversing the vehicle transportation network at 4500, and may be based on the planning metrics identified at 4100, the expected efficiency information identified at 4200, the expected operational range information determined at 4300, or a combination thereof. In some embodiments, generating the user-specific efficiency profile information at 4600 and storing the user-specific efficiency profile information at 4700 may be similar to generating and storing the user-specific efficiency profile information as shown in FIGS. 15-17.

FIG. 5 is a diagram of a method of identifying planning metrics for electric vehicle range prediction in accordance with this disclosure. In some embodiments, identifying planning metrics 5000 for electric vehicle range prediction may be similar to the planning metrics identification shown at 4100 in FIG. 4. Identifying planning metrics for electric vehicle range prediction may be implemented in a portable electronic computing and communication device, such as the portable electronic computing and communication device 1000 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to perform identifying planning metrics 5000 for electric vehicle range prediction.

Implementations of identifying planning metrics 5000 for electric vehicle range prediction may include identifying location information at 5100, identifying temporal information at 5200, identifying route information at 5300, identifying predicted ambient temperature information at 5400, identifying vehicle state information at 5500, or a combination thereof. Although not shown separately in FIG. 5, in some implementations, identifying planning metrics at 5000 may include identifying vehicle transportation network information, such as the identifying vehicle transportation network information shown at 4000 in FIG. 4 or the identifying vehicle transportation network information shown in FIG. 6.

Figure 7:
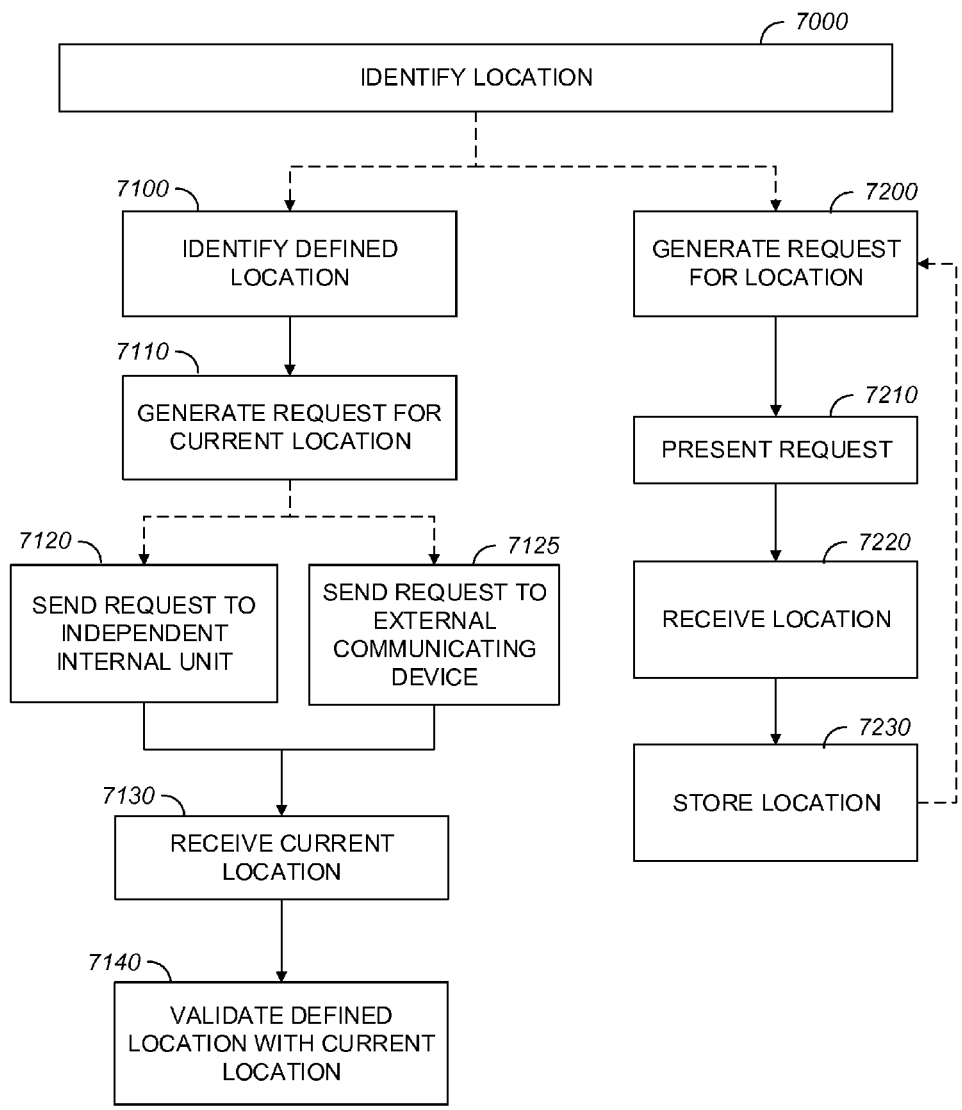
FIG. 7 is a diagram of a method of identifying location information for electric vehicle range prediction in accordance with this disclosure.

In some embodiments, location information may be identified at 5100. Identifying location information at 5100 may include identifying defined location information, identifying current location information, or a combination thereof. For example, identifying location information at 5100 may be similar to identifying location information as shown in FIG. 7.

Figure 8:
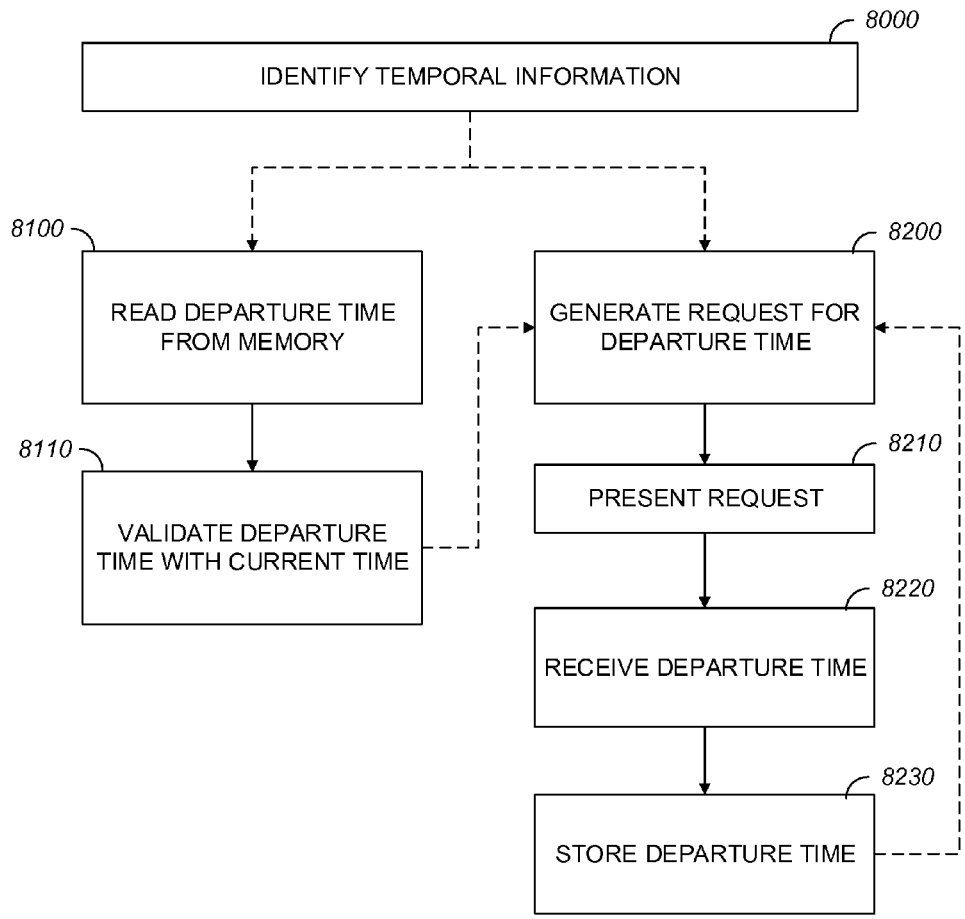
FIG. 8 is a diagram of a method of identifying temporal information for electric vehicle range prediction in accordance with this disclosure.

In some embodiments, temporal information may be identified at 5200. Identifying temporal information at 5200 may include identifying defined temporal information, identifying current temporal information, or a combination thereof. For example, identifying temporal information at 5200 may be similar to identifying temporal information as shown in FIG. 8.

Figure 9:
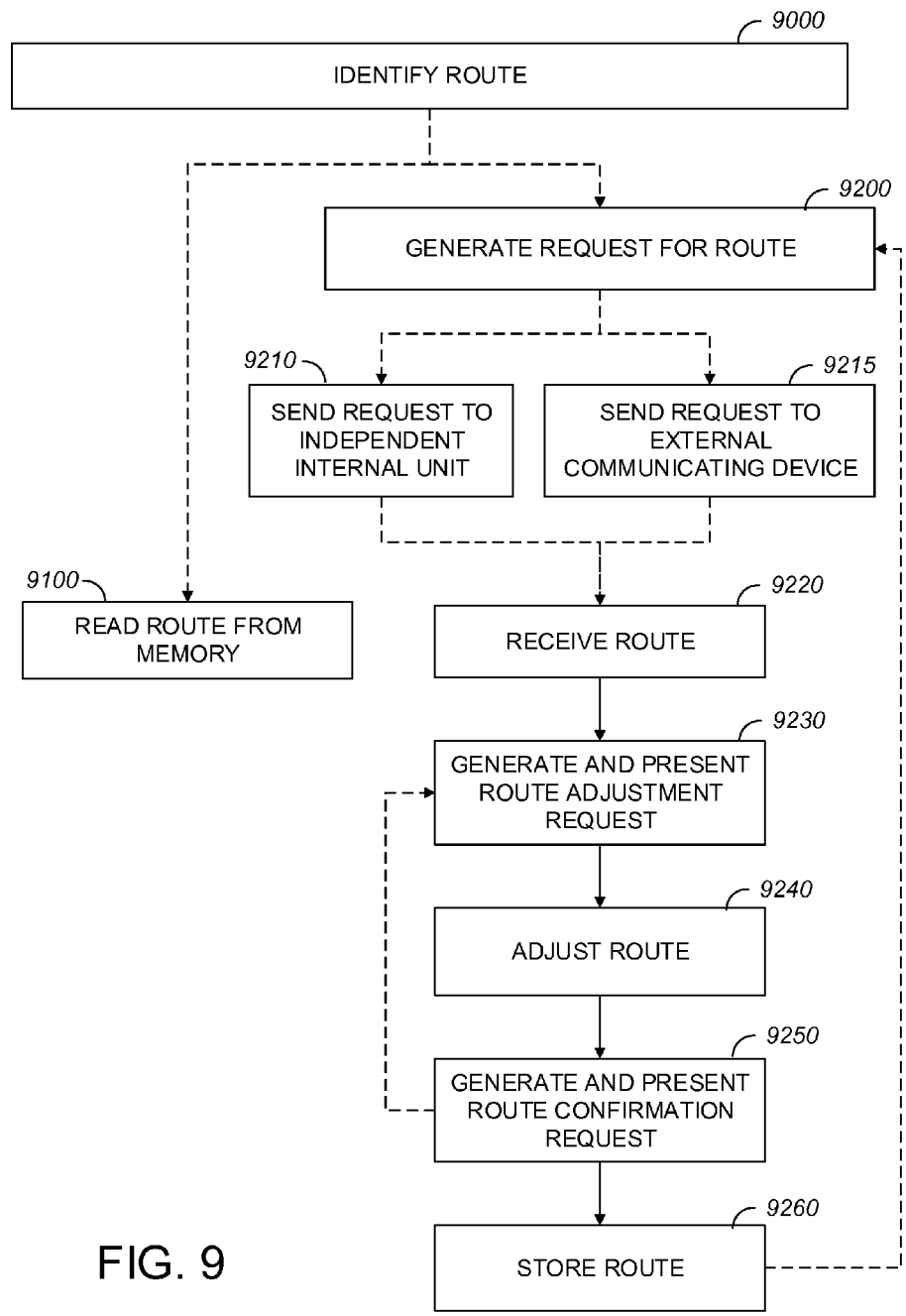
FIG. 9 is a diagram of a method of identifying route information for electric vehicle range prediction in accordance with this disclosure.

In some embodiments, route information may be identified at 5300. Identifying route information at 5300 may include identifying defined route information, generating route information, or a combination thereof. For example, identifying route information at 5300 may be similar to identifying route information as shown in FIG. 9.

Figure 10:
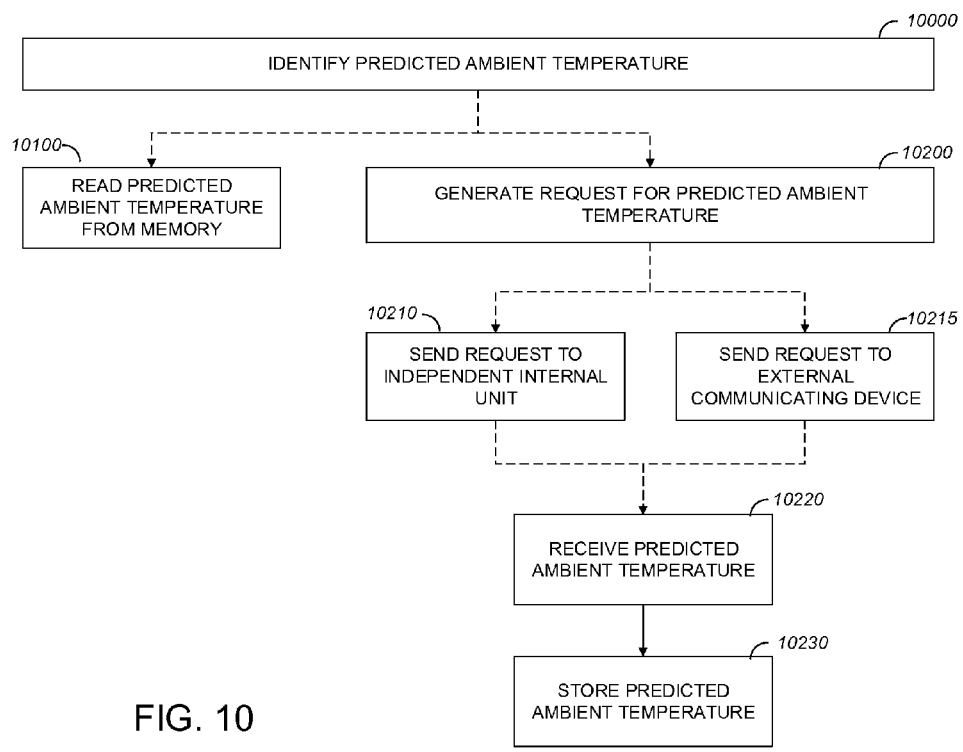
FIG. 10 is a diagram of a method of identifying predicted ambient temperature information for electric vehicle range prediction in accordance with this disclosure.

In some embodiments, predicted ambient temperature information may be identified at 5400. Identifying predicted ambient temperature information at 5400 may include identifying defined predicted ambient temperature information, identifying current predicted ambient temperature information, or a combination thereof. For example, identifying predicted ambient temperature information at 5400 may be similar to identifying predicted ambient temperature information as shown in FIG. 10.

Figure 11:
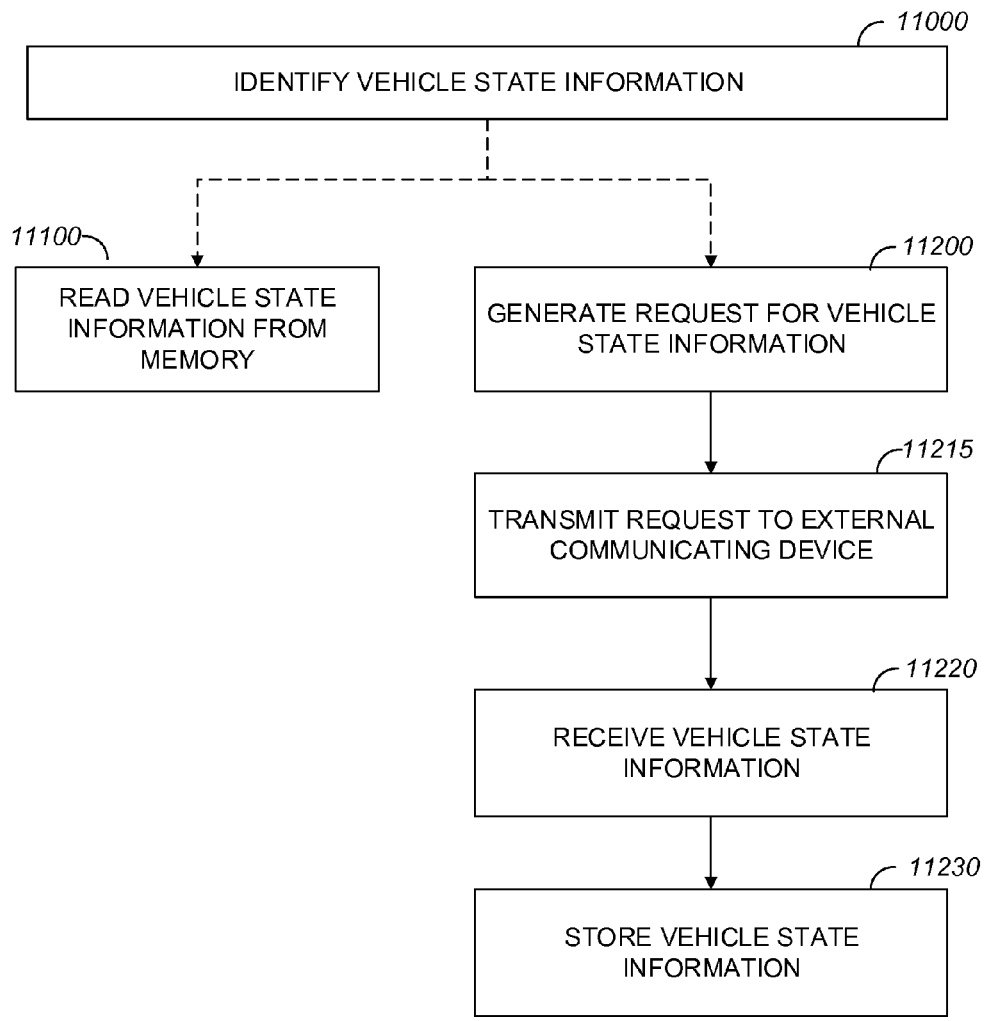
FIG. 11 is a diagram of a method of identifying vehicle state information for electric vehicle range prediction in accordance with this disclosure.

In some embodiments, vehicle state information may be identified at 5500. Identifying vehicle state information at 5500 may include identifying defined vehicle state information, identifying current vehicle state information, or a combination thereof. For example, identifying vehicle state information at 5500 may be similar to identifying vehicle state information as shown in FIG. 11.

FIG. 6 is a diagram of a method of identifying vehicle transportation network information for electric vehicle range prediction in accordance with this disclosure. The vehicle transportation network information may include locations, such as a first location, which may correspond to a home of a user of the portable electronic computing and communication device, who may be a driver of the electric vehicle, a second location, which may correspond to a work location of the user, or any other location in the vehicle transportation network that may be represented in the vehicle transportation network information. In some embodiments, the vehicle transportation network information may include road topology information.

In some embodiments, identifying vehicle transportation network information 6000 for electric vehicle range prediction may be similar to the vehicle transportation network information identification shown at 4000 in FIG. 4 or may be included in the planning metrics identification shown at 4100 in FIG. 4 or the planning metrics identification shown at 5000 in FIG. 5. Identifying vehicle transportation network information 6000 for electric vehicle range prediction may be implemented in a portable electronic computing and communication device, such as the portable electronic computing and communication device 1000 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to perform identifying vehicle transportation network information 6000 for electric vehicle range prediction.

Implementations of identifying vehicle transportation network information 6000 for electric vehicle range prediction may include reading the vehicle transportation network information, or a portion thereof, at 6100, generating a request for the vehicle transportation network information, or a portion thereof, at 6200, or a combination thereof. In FIG. 6 broken lines are shown to indicate elements that may be omitted, or may be performed in combination with other elements. For example, identifying vehicle transportation network information 6000 for electric vehicle range prediction may include reading the vehicle transportation network information from memory at 6100 and requesting the vehicle transportation network information at 6200 may be omitted. In another example, the vehicle transportation network information may be requested at 6200 and reading the vehicle transportation network information from memory at 6100 may be omitted.

In some embodiments, the vehicle transportation network information, or a portion thereof, may be read from a memory at 6100. For example, identifying vehicle transportation network information 6000 may be implemented in the portable electronic computing and communication device 1000 shown in FIG. 1, and the processor 1020 of the portable electronic computing and communication device may read vehicle transportation network information stored on the memory 1030 of the portable electronic computing and communication device 1000.

In some embodiments, the vehicle transportation network information may be stored in the memory of the portable electronic computing and communication device independently of the implementation of electric vehicle range prediction. For example, the vehicle transportation network information may be stored in the memory of the portable electronic computing and communication device in association with an application other than the implementation of electric vehicle range prediction, such as a mapping application. In some embodiments, reading the vehicle transportation network information at 6100 may include receiving the vehicle transportation network information from an application associated with the vehicle transportation network information on the portable electronic computing and communication device.

In some embodiments, the vehicle transportation network information, or a portion thereof, may be requested from an external communicating device, such as the communication device 3400 shown in FIG. 3. For example, identifying vehicle transportation network information 6000 may be implemented in the portable electronic computing and communication device 1000 shown in FIG. 1, and the processor 1020 of the portable electronic computing and communication device may generate a request for the vehicle transportation network information at 6200, transmit the request for the vehicle transportation network information at 6210, receive the vehicle transportation network information at 6220, or a combination thereof.

In some embodiments, vehicle transportation network information may be read from memory at 6100 and may be requested at 6200. For example, a first portion of the vehicle transportation network information may be read from memory at 6100 and a second portion of the vehicle transportation network information may be requested at 6200. In another example, the vehicle transportation network information may be read from memory at 6100, and the vehicle transportation network information may be modified or updated based on vehicle transportation network information requested at 6200.

FIG. 7 is a diagram of a method of identifying location information for electric vehicle range prediction in accordance with this disclosure. The location information may include a defined home location, a defined work location, or any other defined location identifiable in the vehicle transportation network information.

In some embodiments, identifying location information 7000 for electric vehicle range prediction may be similar to the location information identification shown at 5100 in FIG. 5. Identifying location information 7000 for electric vehicle range prediction may be implemented in a portable electronic computing and communication device, such as the portable electronic computing and communication device 1000 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to perform location information identification 7000 for electric vehicle range prediction.

Implementations of identifying location information 7000 for electric vehicle range prediction may include reading defined location information from memory at 7100, requesting location information at 7200, or a combination thereof. In FIG. 7 broken lines are shown to indicate elements that may be omitted, or may be performed in combination with other elements. For example, identifying location information 7000 for electric vehicle range prediction may include reading defined location information at 7100, and requesting the location information at 7200 may be omitted.

In some embodiments, the location information may include one or more of a home location for the user of the portable electronic computing and communication device, such as a home address or corresponding GPS coordinates, a work location for the user, such as a work address or corresponding GPS coordinates, or information indicating any other identified location.

In some embodiments, defined location information may be read at 7100. For example, identifying location information 7000 may be implemented in the portable electronic computing and communication device 1000 shown in FIG. 1, and the processor 1020 of the portable electronic computing and communication device may read defined location information stored on the memory 1030 of the portable electronic computing and communication device 1000.

In some embodiments, reading the defined location information at 7100 may include generating or updating defined location information. For example, a defined location, such as a defined home location, may be read from memory at 7100 and the defined location may be modified, which may be similar to the location identification show at 7200/7210/7220/7230, in response to input, such as user input indicating a change in location information, such as a change in home location. In another example, a new defined location may be identified, which may be similar to the location identification show at 7200/7210/7220/7230, in response to input, such as user input indicating a new location.

In some embodiments, identifying the location information at 7000 may include identifying current location information. For example, identifying location information 7000 may be implemented in the portable electronic computing and communication device 1000 shown in FIG. 1, and the processor 1020 of the portable electronic computing and communication device may identify a current location of the portable electronic computing and communication device 1000.

In some embodiments, identifying the current location information may include generating a current location request at 7110, sending the current location request to an internal unit of the portable electronic computing and communication device at 7120, sending the request to an external communicating device at 7125, receiving current location information at 7130, or a combination thereof. For example, the portable electronic computing and communication device may generate the current location request at 7110 and may send the current location request to an internal unit of the portable electronic computing and communication device, such as the location unit 1060 shown in FIG. 1, at 7120. In another example, the portable electronic computing and communication device may generate the current location request at 7110 and may send the current location request to an external communicating device, such as the communicating device 3400 shown in FIG. 3, at 7125. In some embodiments, identifying the current location information may be performed in response to input, such as user input indicating a request to determine an expected operational range.

In some embodiments, the portable electronic computing and communication device may receive current location information at 7130. In some embodiments, the current location information may include a current geospatial location of the portable electronic computing and communication device, a current geospatial location of the electric vehicle, or both.

In some embodiments, the current location information may be validated with the defined location information at 7140. For example, the defined location information may indicate a home location and a work location, and validating the location information at 7140 may include determining a distance between the current location and the defined home location, a distance between the current location and the defined work location, or both. In some embodiments, validating the location information may include determining whether a difference between the current location and the defined location information is within a proximity threshold. For example, validating the location information may include determining that the current location corresponds with the defined home location if the current location is proximate to the defined home location, such as where the difference between the current location and the defined home location is within the proximity threshold. In another example, validating the location information may include determining that the current location corresponds with the defined work location if the current location is proximate to the defined work location, such as where the difference between the current location and the defined work location is within the proximity threshold.

In some embodiments, the defined location information, or a portion thereof, may be unavailable and identifying the location information at 7000 may include generating the defined location information. For example, the defined location information may be omitted from the memory of the portable electronic computing and communication device, and the portable electronic computing and communication device may generate the defined location information.

In some embodiments, generating the defined location information may include generating a request for the defined location information at 7200, presenting the request for defined location information at 7210, receiving the defined location information at 7220, storing the defined location at 7230, or a combination thereof.

For example, the portable electronic computing and communication device may generate a request for defined location information at 7200 and may present the request to the user of the portable electronic computing and communication device at 7210 via a user interface of the portable electronic computing and communication device, such as the user interface 1040 as shown in FIG. 1. The user may input information indicating the defined location information via the user interface, the defined location may be received in response to input, such as the user input, at 7220, and may be stored, such as in the memory of the portable electronic computing and communication device at 7230. For example, the user may input an address as the defined location information, or the user may include that a current location of the portable electronic computing and communication device corresponds with the defined location. In some embodiments, generating the defined location information may include identifying multiple defined locations, such as a defined home location and a defined work location. In some embodiments, storing the defined location information may include storing the defined location information in association with the user.

FIG. 8 is a diagram of a method of identifying temporal information for electric vehicle range prediction in accordance with this disclosure. The temporal information may include expected departure temporal information for each trip, or trip portion. For example, the temporal information may include expected departure temporal information for traveling from home to work, which may correspond with a defined or average departure time for the user to commute from home to work. In another example, the temporal information may include expected departure temporal information for a second trip, such as traveling from work to home, which may correspond with a defined or average departure time for the user to commute home from work. The temporal information may include, for example, a date, a day of the week, a time of day, or a combination thereof.

In some embodiments, identifying temporal information 8000 for electric vehicle range prediction may be similar to the temporal information identification shown at 5200 in FIG. 5. Identifying temporal information 8000 for electric vehicle range prediction may be implemented in a portable electronic computing and communication device, such as the portable electronic computing and communication device 1000 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to perform temporal information identification 8000 for electric vehicle range prediction.

Implementations of identifying temporal information 8000 for electric vehicle range prediction may include reading defined temporal information from memory at 8100, requesting temporal information at 8200, or a combination thereof. In FIG. 8 broken lines are shown to indicate elements that may be omitted, or may be performed in combination with other elements. For example, identifying temporal information 8000 for electric vehicle range prediction may include reading defined temporal information at 8100, and requesting the temporal information at 8200 may be omitted.

In some embodiments, the temporal information may be associated with traversing the vehicle transportation network from one defined location to another defined location. For example, the temporal information may include a defined time for traversing the vehicle transportation network from a defined home location to a defined work location, and the temporal information may include a defined time for traversing the vehicle transportation network from the defined work location to the defined home location. In an example, the temporal information may indicate a departure time, such as 7:00 a.m., for traversing the vehicle transportation network from the defined home location to the defined work location, and may include a indicate a departure time, such as 6:00 p.m., for traversing the vehicle transportation network from the defined work location to the defined home location.

In some embodiments, current temporal information may be validated with the defined temporal information at 8110. Although not shown separately in FIG. 8, validating the temporal information at 8110 may include reading or receiving the current temporal information, such as from memory or from an external communicating device. In some embodiments, validating the temporal information at 8110 may include determining whether a difference between the current temporal information and the defined temporal information is within a temporal threshold. For example, the current location of the portable electronic computing and communication device may be validated as corresponding to the home location as shown in FIG. 7, a difference between the current temporal information and the defined departure time for traversing the vehicle transportation network from the home location to the work location may be within the temporal threshold, and the current temporal information may be validated as corresponding to the defined home departure temporal information. In another example, the current location of the portable electronic computing and communication device may be validated as corresponding to the work location as shown in FIG. 7, a difference between the current temporal information and the defined departure time for traversing the vehicle transportation network from the work location to the home location may be within the temporal threshold, and the current temporal information may be validated as corresponding to the defined work departure temporal information.

In some embodiments, the defined temporal information, or a portion thereof, may be unavailable and identifying the temporal information at 8000 may include generating the defined temporal information. For example, the defined temporal information may be omitted from the memory of the portable electronic computing and communication device, and the portable electronic computing and communication device may generate the defined temporal information.

In some embodiments, generating the defined temporal information may include generating a request for the defined temporal information at 8200, presenting the request for defined temporal information at 8210, receiving the defined temporal information at 8220, storing the defined temporal at 8230, or a combination thereof.

For example, the portable electronic computing and communication device may generate a request for defined temporal information at 8200 and may present the request to the user of the portable electronic computing and communication device at 8210 via a user interface of the portable electronic computing and communication device, such as the user interface 1040 as shown in FIG. 1. The user may input information indicating the defined temporal information via the user interface, the defined temporal information may be received in response to input, such as the user input, at 8220, and may be stored, such as in the memory of the portable electronic computing and communication device at 8230. For example, the user may input an departure time for traveling from home to work as the defined home departure temporal information. In some embodiments, storing the defined temporal information may include storing the defined temporal information in association with the user.

FIG. 9 is a diagram of a method of identifying route information for electric vehicle range prediction in accordance with this disclosure. In some embodiments, identifying route information 9000 for electric vehicle range prediction may be similar to the route information identification shown at 5300 in FIG. 5. Identifying route information 9000 for electric vehicle range prediction may be implemented in a portable electronic computing and communication device, such as the portable electronic computing and communication device 1000 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to perform route information identification 9000 for electric vehicle range prediction.

Implementations of identifying route information 9000 for electric vehicle range prediction may include reading defined route information from memory at 9100, requesting route information at 9200, or a combination thereof. In FIG. 9 broken lines are shown to indicate elements that may be omitted, or may be performed in combination with other elements. For example, identifying route information 9000 for electric vehicle range prediction may include reading defined route information at 9100, and requesting the route information at 9200 may be omitted.

In some embodiments, the route information may be associated with traversing the vehicle transportation network from one defined location to another defined location. For example, the route information may include a defined route for traversing the vehicle transportation network from a defined home location to a defined work location, and the route information may include a defined route for traversing the vehicle transportation network from the defined work location to the defined home location.

In some embodiments, the defined route information, or a portion thereof, may be unavailable and identifying the route information at 9000 may include generating the defined route information. For example, the defined route information may be omitted from the memory of the portable electronic computing and communication device, and the portable electronic computing and communication device may generate the defined route information.

In some embodiments, generating the defined route information may include generating a request for the defined route information at 9200, sending the route request to an internal unit of the portable electronic computing and communication device at 9210, sending the request to an external communicating device at 9215, receiving route information at 9220, generating and presenting a route adjustment request at 9230, adjusting the route information at 9240, generating and presenting a route confirmation request at 9250, storing the route information at 9260, or a combination thereof.

For example, the portable electronic computing and communication device may generate the defined route request at 9200 and may send the defined route request to an internal unit of the portable electronic computing and communication device at 9210. In another example, the portable electronic computing and communication device may generate the defined route request at 9200 and may send the defined route request to an external communicating device, such as the communicating device 3400 shown in FIG. 3, at 9215. In some embodiments, the defined route request may include a request for one or more candidate routes from a defined location, such as the defined home location, to another defined location, such as the defined work location.

In some embodiments, route information may be received at 9220. For example, route information requested at 9200/9210/9215 may indicate a request for route information from a defined home location to a defined work location, and receiving the route information at 9220 may include receiving an optimized route from the defined home location to the defined work location. In another example, receiving the route information at 9220 may include receiving multiple candidate routes, and selecting an optimal route.

In some embodiments, a route adjustment request may be generated and presented at 9230. For example, the portable electronic computing and communication device may generate a map representing the route and may present the map to a user.

In some embodiments, the route may be adjusted at 9240. In some embodiments, the route may be adjusted in response to input, such as user input. For example, the user may input an adjustment to the map presented at 9230, and adjusting the route at 9240 may include updating the route in response to the user input.

In some embodiments, a route confirmation request may be generated and presented at 9250. For example, the portable electronic computing and communication device may generate a map representing the route, which may be the adjusted route, and may present the map to a user. In some embodiments, adjusting the route at 9230/9240 and confirming the route at 9250 may be combined. In some embodiments, adjusting the route information at 9230/9240 and confirming the route information at 9250 may be performed repeatedly until the route information is confirmed or until no further adjustments are input.

In some embodiments, generating route information at 9200-9260 may be performed for one or more defined combinations of origin and destination. For example, the location information identified as shown in FIG. 7 may include a defined home location, a defined work location, and a defined intermediate location, and route information may be generated for travel from the defined home location to the defined work location, from the defined home location to the defined intermediate location, from the defined intermediate location to the defined home location, from the defined intermediate location to the defined work location, from the defined work location to the defined intermediate location, from the defined work location to the defined home location, or any combination thereof.

In some embodiments, the defined route information may be stored at 9260. For example, the portable electronic computing and communication device may store the defined route information in a memory of the portable electronic computing and communication device. In some embodiments, storing the defined route information may include storing the defined route information in association with the user.

Although not shown separately in FIG. 4, in some implementations, electric vehicle range prediction may include electric vehicle range prediction configuration, which may include elements of identifying planning metrics as shown in FIGS. 4-9. For example, electric vehicle range prediction configuration may include generating defined location information as shown at 7200/7210/7220/7230 in FIG. 7, generating defined temporal information as shown at 8200/8210/8220/8230 in FIG. 8, generating defined route information as shown at 9200/9210/9215/9220/9230/9240/9250/9260 in FIG. 9, or a combination thereof.

In an example, the portable electronic computing and communication device may perform configuration by generating a defined home location request at 7200, presenting the defined home location request at 7210, receiving the defined home location information at 7220, storing the defined home location information at 7230, generating a defined work location request at 7200, presenting the defined work location request at 7210, receiving the defined work location information at 7220, storing the defined work location information at 7230, generating a defined home-to-work departure temporal information request at 8200, presenting the defined home-to-work departure temporal information request at 8210, receiving the defined home-to-work departure temporal information at 8220, storing the defined home-to-work departure temporal information at 8230, generating a defined work-to-home departure temporal information request at 8200, presenting the defined work-to-home departure temporal information request at 8210, receiving the defined work-to-home departure temporal information at 8220, storing the defined work-to-home departure temporal information at 8230, generating a defined home-to-work route information request at 9200, sending the defined home-to-work route information request at 9210/9215, receiving the defined home-to-work route at 9220, generating and presenting a defined home-to-work route adjustment request at 9230, adjusting the defined home-to-work route at 9240, generating and presenting a defined home-to-work route confirmation request at 9250, storing the defined home-to-work route information at 9260, generating a defined work-to-home route information request at 9200, sending the defined work-to-home route information request at 9210/9215, receiving the defined work-to-home route at 9220, generating and presenting a defined work-to-home route adjustment request at 9230, adjusting the defined work-to-home route at 9240, generating and presenting a defined work-to-home route confirmation request at 9250, and storing the defined work-to-home route information at 9260.

FIG. 10 is a diagram of a method of identifying predicted ambient temperature information for electric vehicle range prediction in accordance with this disclosure. In some embodiments, identifying predicted ambient temperature information 10000 for electric vehicle range prediction may be similar to the predicted ambient temperature information identification shown at 5400 in FIG. 5. Identifying predicted ambient temperature information 10000 for electric vehicle range prediction may be implemented in a portable electronic computing and communication device, such as the portable electronic computing and communication device 1000 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to perform predicted ambient temperature information identification 10000 for electric vehicle range prediction.

Implementations of identifying predicted ambient temperature information 10000 for electric vehicle range prediction may include reading predicted ambient temperature information from memory at 10100, requesting predicted ambient temperature information at 10200, or a combination thereof. In FIG. 10 broken lines are shown to indicate elements that may be omitted, or may be performed in combination with other elements. For example, identifying predicted ambient temperature information 10000 for electric vehicle range prediction may include reading predicted ambient temperature information at 10100, and requesting the predicted ambient temperature information at 10200 may be omitted.

In some embodiments, the predicted ambient temperature information may be associated with defined departure temporal information for traversing the vehicle transportation network from a defined location, such as a defined home location, to another defined location, such as a defined work location. For example, the predicted ambient temperature information may include predicted ambient temperature information associated with the defined departure temporal information and the defined home location.

In some embodiments, the predicted ambient temperature information may be read from memory at 10100. For example, independent of electric vehicle range prediction, the portable electronic computing and communication device may store predicted future ambient temperature information in the memory of the portable electronic computing and communication device. For example, a weather application implemented by the portable electronic computing and communication device may receive and store the predicted ambient temperature information periodically or in response to events.

In some embodiments, a request for the predicted ambient temperature information may be generated at 10200. In some embodiments, the request may include location information, such as the location information identified as shown at 5100 in FIG. 5 or as shown in FIG. 7, temporal information, such as the temporal information identified as shown at 5200 in FIG. 5 or as shown in FIG. 8, or a combination of location information and temporal information. For example, the request may be a request for ambient temperature information for travel from home to work, and the request may identify the home location and the expected departure temporal information. In some embodiments, the request may identify multiple locations and times. For example, the request may be a request for ambient temperature information for travel from home to work in the morning and for return travel from work to home in the evening, and the request may identify the home location, the expected morning departure temporal information, the work location, and the expected evening departure temporal information.

In some embodiments, the request for the predicted ambient temperature information generated at 10200 may be sent to an independent internal unit of the portable electronic computing and communication device at 10210. For example, the request may be sent to a weather unit of the portable electronic computing and communication device.

In some embodiments, the request for the predicted ambient temperature information generated at 10200 may be sent to an external data source, such as the communicating device 3400 shown in FIG. 3, via a communication system, such as the electronic communication network 3300 shown in FIG. 3, at 10215.

In some embodiments, predicted ambient temperature information may be received at 10220. For example, the predicted ambient temperature information may be received at 10220 in response to sending the predicted ambient temperature request at 10210/10215. The received predicted ambient temperature information may correspond with location information, such as the location information identified as shown at 5100 in FIG. 5 or as shown in FIG. 7, temporal information, such as the temporal information identified as shown at 5200 in FIG. 5 or as shown in FIG. 8, or a combination of location information and temporal information. For example, the predicted ambient temperature information may indicate a predicted ambient temperature at the defined home location at 7:00 a.m., which may correspond with the defined departure temporal information for traveling from home to work.

In some embodiments, the predicted ambient temperature information may be stored at 10230, such as in a memory of the portable electronic computing and communication device. In some embodiments, the predicted ambient temperature information may be stored in association with the user, the vehicle, the expected departure temporal information, the route, or a combination thereof.

FIG. 11 is a diagram of a method of identifying vehicle state information for electric vehicle range prediction in accordance with this disclosure. In some embodiments, identifying vehicle state information 11000 for electric vehicle range prediction may be similar to the vehicle state information identification shown at 5500 in FIG. 5. Identifying vehicle state information 11000 for electric vehicle range prediction may be implemented in a portable electronic computing and communication device, such as the portable electronic computing and communication device 1100 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to perform vehicle state information identification 11000 for electric vehicle range prediction.

Implementations of identifying vehicle state information 11000 for electric vehicle range prediction may include reading vehicle state information from memory at 11100, requesting vehicle state information at 11200, or a combination thereof. In FIG. 11 broken lines are shown to indicate elements that may be omitted, or may be performed in combination with other elements. For example, identifying vehicle state information 11000 for electric vehicle range prediction may include reading vehicle state information at 11100, and requesting the vehicle state information at 11200 may be omitted.

In some embodiments, the vehicle state information may be read from memory at 11100. For example, the portable electronic computing and communication device may store vehicle state information for the electric vehicle in the memory of the portable electronic computing and communication device periodically or in response to events.

In some embodiments, a request for the vehicle state information may be generated at 11200. In some embodiments, the request may include information identifying the electric vehicle, the user, or both. In some embodiments, the request may include an authentication token securely identifying the electric vehicle, the user, or both. In some embodiments, generating the request at 11200 may include generating the request in conformance with a defined application programming interface (API).

In some embodiments, the request for vehicle state information generated at 11200 may be sent to an external data source, such as the communicating device 3400 shown in FIG. 3, via a communication system, such as the electronic communication network 3300 shown in FIG. 3, at 11215. In some embodiments, sending the request at 11215 may include sending the request in conformance with the API.

In some embodiments, vehicle state information may be received at 11220. For example, the vehicle state information may be received at 11220 in response to sending the vehicle state information request at 11215. The received vehicle state information may indicate current state information for the electric vehicle, such as current odometer information, a current state of charge of a battery of the electric vehicle, a capacity of the battery of the electric vehicle, or a combination thereof. In some embodiments, the state of charge of the battery of the electric vehicle may be expressed in kilowatt hours (kWh), as a percentage of capacity, or any other indication of currently available battery power. In some embodiments, the vehicle state information may indicate the battery capacity information, which may indicate an optimal maximum battery capacity, a current maximum battery capacity, or both. For example, the maximum battery capacity may degrade over time, and the current maximum battery capacity may be less than the optimal maximum battery capacity. The expected operational range may be determined using the current maximum battery capacity.

In some embodiments, the vehicle state information may be stored at 11230, such as in a memory of the portable electronic computing and communication device. In some embodiments, the vehicle state information may be stored in association with the user, the vehicle, the expected departure temporal information, the route, or a combination thereof.

Figure 12:
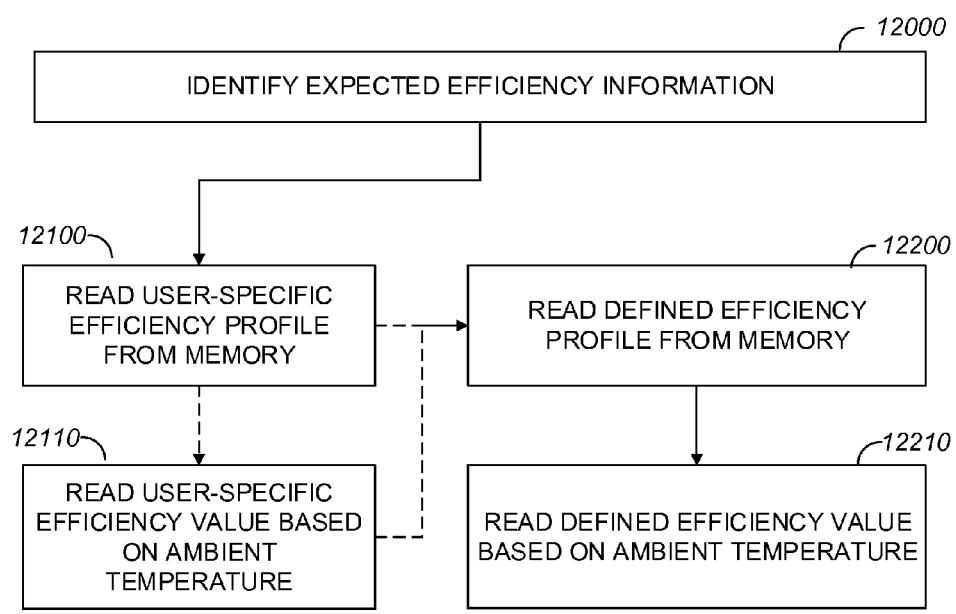
FIG. 12 is a diagram of a method of identifying expected efficiency information for electric vehicle range prediction in accordance with this disclosure.

FIG. 12 is a diagram of a method of identifying expected efficiency information for electric vehicle range prediction in accordance with this disclosure. In some embodiments, the expected efficiency information may include an expected efficiency value, which may represent an expected cost per unit distance for the user to drive the electric vehicle at a defined ambient temperature.

In some embodiments, identifying expected efficiency information 12000 for electric vehicle range prediction may be similar to the expected efficiency information identification shown at 4200 in FIG. 4. Identifying expected efficiency information 12000 for electric vehicle range prediction may be implemented in a portable electronic computing and communication device, such as the portable electronic computing and communication device 1100 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to perform expected efficiency information identification 12000 for electric vehicle range prediction.

Implementations of identifying expected efficiency information 12000 for electric vehicle range prediction may include reading a user-specific efficiency profile from memory at 12100, reading a defined efficiency profile from memory at 12200, reading a user-specific efficiency value from the user-specific efficiency profile at 12110, reading a defined efficiency value from the defined efficiency profile at 12210, or a combination thereof. In FIG. 12 broken lines are shown to indicate elements that may be omitted, or may be performed in combination with other elements. For example, identifying expected efficiency information 12000 for electric vehicle range prediction may include reading a user-specific efficiency value from the user-specific efficiency profile at 12110, and reading a defined efficiency value from the defined efficiency profile at 12210 may be omitted.

In some embodiments, a user-specific efficiency profile may be identified at 12100. For example, the portable electronic computing and communication device may read the user-specific efficiency profile from a memory of the portable electronic computing and communication device based on the electric vehicle and the user.

In some embodiments, a user-specific efficiency value may be identified from the user-specific efficiency profile at 12110. The user-specific efficiency value may indicate an expected operational efficiency for the electric vehicle driven by the user corresponding to an expected ambient temperature, such as the expected ambient temperature identified as shown at 5400 in FIG. 5 or as shown in FIG. 10. The user-specific efficiency value may indicate an expected power utilization rate, or cost, for the electric vehicle driven by the user at the expected ambient temperature and may be expressed as kilowatt-hours-per-mile (kWh/mi). In some embodiments, the user-specific efficiency value may be identified at 12110 and identifying the defined efficiency profile at 12200 and identifying the defined efficiency value at 12210 may be omitted.

In some embodiments, a defined efficiency profile may be identified at 12200. For example, the portable electronic computing and communication device may read the defined efficiency profile from a memory of the portable electronic computing and communication device based on the electric vehicle. In some embodiments, the defined efficiency profile may be a user-agnostic efficiency profile. The defined efficiency profile may indicate defined efficiency values for the electric vehicle at multiple ambient temperatures, such as efficiency values defined for a fictive or average user. In some embodiments, the user-specific efficiency profile identification at 12100 may be omitted, a user-specific efficiency profile may unavailable, identification of the user-specific efficiency value at 12110 may be omitted, or the user-specific efficiency profile identified at 12100 may omit a user-specific efficiency value corresponding to the expected ambient temperature, and the defined efficiency profile may be identified at 12200.

In some embodiments, a defined efficiency value may be identified from the defined efficiency profile at 12210. The defined efficiency value may indicate an expected operational efficiency for the electric vehicle driven by a fictive or average user corresponding to an expected ambient temperature, such as the expected ambient temperature identified as shown at 5400 in FIG. 5 or as shown in FIG. 10. The defined efficiency value may indicate an expected power utilization rate, or cost, for the electric vehicle driven by the fictive or average user at the expected ambient temperature and may be expressed as kilowatt-hours-per-mile (kWh/mi). In some embodiments, the user-specific efficiency profile identification at 12100 may be omitted, a user-specific efficiency profile may unavailable, identification of the user-specific efficiency value at 12110 may be omitted, or the user-specific efficiency profile identified at 12100 may omit a user-specific efficiency value corresponding to the expected ambient temperature, and the defined efficiency value may be identified at 12210.

Although not shown separately, in some embodiments, the efficiency profile may be identified based on an efficiency mode. For example, efficiency information identified at 12000 may be based on a user-specific efficiency profile for a first efficiency mode, a user-agnostic efficiency profile for the first efficiency mode, a user-specific efficiency profile for a second efficiency mode, or a user-agnostic efficiency profile for the second efficiency mode. The efficiency mode may indicate an operational mode for the electric vehicle. For example, the second efficiency mode may indicate that the electric vehicle is operated in an enhanced efficiency mode, which may correspond with vehicle operations that have a reduced ecological cost relative to the first efficiency mode.

An example of a portion of a defined efficiency profile is shown in FIG. 16, and an example of a portion of a user-specific efficiency profile is shown in FIG. 17.

Figure 13:
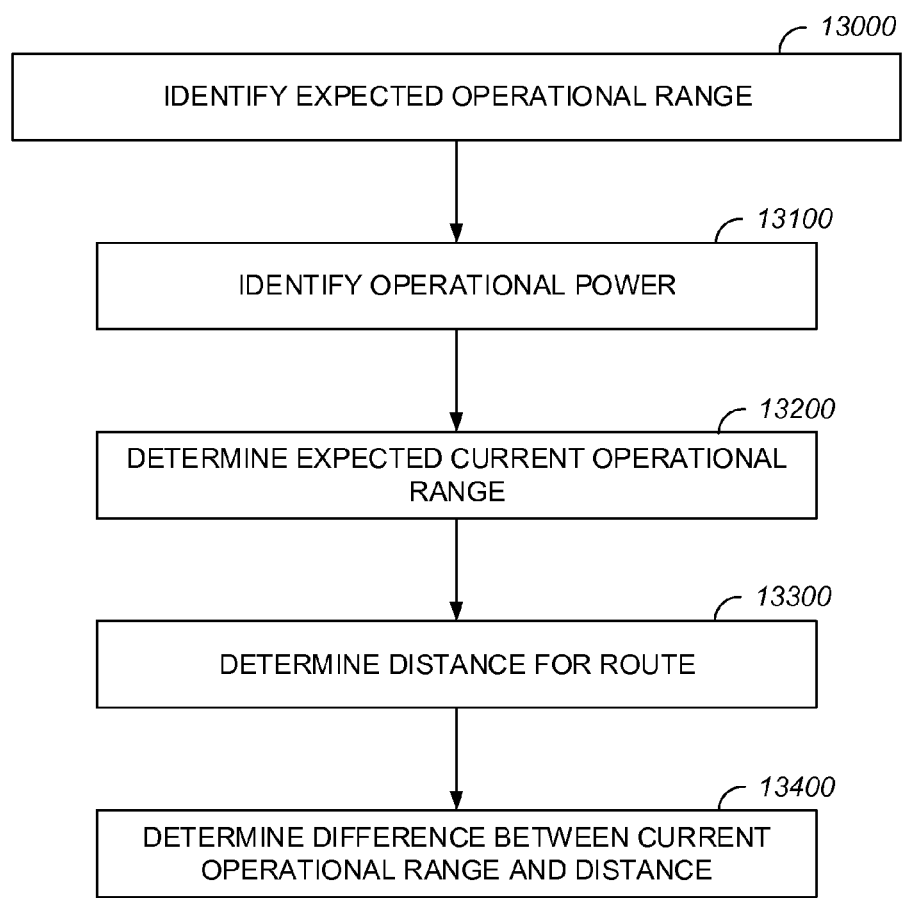
FIG. 13 is a diagram of a method of identifying expected operational range information for electric vehicle range prediction in accordance with this disclosure.

FIG. 13 is a diagram of a method of identifying expected operational range information for electric vehicle range prediction in accordance with this disclosure. In some embodiments, identifying expected operational range information 13000 for electric vehicle range prediction may be similar to the expected operational range information identification shown at 4300 in FIG. 4. Identifying expected operational range information 13000 for electric vehicle range prediction may be implemented in a portable electronic computing and communication device, such as the portable electronic computing and communication device 1100 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to perform expected operational range information identification 13000 for electric vehicle range prediction.

Implementations of identifying expected operational range information 13000 for electric vehicle range prediction may include identifying operational power at 13100, determining an expected current operational range at 13200, determining a route distance at 13300, determining an operational range difference at 13400, or a combination thereof.

In some embodiments, operational power may be identified at 13100. For example, the vehicle state information identified as shown at 5500 in FIG. 5 and as shown in FIG. 11 may indicate the current state of charge of the battery of the electric vehicle as a percentage of capacity and identifying the operational power may include multiplying the current state of charge by the battery capacity, which may be expressed as unit energy, such as kilowatt-hours.

In some embodiments, an expected current operational range may be identified at 13200. In some embodiments, the expected current operational range may be identified based on the current operational power identified at 13100 and the expected efficiency value identified as shown at 4200 in FIG. 4 and as shown in FIG. 12. For example, the expected current operational range may be a quotient of dividing the current operational power by the expected efficiency value, and may be expressed in unit distance, such as miles or kilometers.

In some embodiments, a route distance may be determined at 13300. For example, the route distance may be identified based on the route identified as shown at 5300 in FIG. 5 or as shown in FIG. 9. The route distance may be expressed in unit distance, such as miles or kilometers.

In some embodiments, a remaining distance may be identified at 13400. For example, the remaining distance may be determined as a difference between the expected current operational range identified at 13200 and the route distance identified at 13300. The remaining distance may be the expected operational range R and may indicate an expected available operational range for the electric vehicle after traveling from a first location, such as a defined home location, to a second location, such as a defined work location. In some embodiments, the current state of charge percentage may be expressed as S, the battery capacity may be expressed as B, the expected efficiency value may be expressed as E, the route distance may be expressed as D, and the expected operational range R may be expressed as $R=[(S*B)/E]-D$.

Although not shown separately in FIG. 13, in some embodiments, identifying expected operational range information may include identifying the expected operational range information using predicted charging information, predicted non-operational charge loss information, or both.

In an example, the expected operational range of the electric vehicle after traveling from home to work may be determined substantially before traveling from home to work, the electric vehicle may charge during the period between determining the expected operational range and the subsequent corresponding travel, and determining the expected operational range may include identifying a charging duration, which may correspond with the period between determining the expected operational range and the subsequent corresponding travel, determining whether the charging duration exceeds a minimum charging duration, identifying a charging rate, and, if the charging duration exceeds the minimum charging duration, determining the expected operational range using a product of multiplying the charging rate by the charging duration as the current state of charge of the electric vehicle. In some embodiments, the product of multiplying the charging rate by the charging duration may exceed the maximum capacity of the battery and the maximum capacity of the battery may be used as the current state of charge of the electric vehicle. In some embodiments, the vehicle state information may indicate that the electric vehicle is charging.

In another example, the expected operational range of the electric vehicle after traveling from home to work and subsequently traveling from work to home may be determined before traveling from home to work, the electric vehicle may remotely charge during the period between traveling from home to work and subsequently traveling from work to home, and determining the expected operational range may include identifying a remote charging duration, which may correspond with the period between traveling from home to work and subsequently traveling from work to home, determining whether the remote charging duration exceeds the minimum charging duration, identifying a remote charging rate, and, if the remote charging duration exceeds the minimum charging duration, determining the expected operational range using a product of multiplying the remote charging rate by the remote charging duration as the current state of charge of the electric vehicle. In some embodiments, the product of multiplying the remote charging rate by the remote charging duration may exceed the maximum capacity of the battery and the maximum capacity of the battery may be used as the predicted state of charge of the electric vehicle. In some embodiments, the remote charging information may be identified in response to input, such as user input expressly indicating the remote charging information, input identifying a defined remote charger, or determined average, or historical, charging information. In some embodiments, the charging period may be identified based as a temporal difference between expected arrival temporal information for the second location and the expected departure temporal information for the second trip. In some embodiments, the expected arrival temporal information may be determined based on the expected departure temporal information for the first trip and the route for the first trip.

In another example, the expected operational range of the electric vehicle after traveling from home to work may be determined substantially before traveling from home to work, the electric vehicle may non-operationally lose charge during the period between determining the expected operational range and the subsequent corresponding travel, and determining the expected operational range may include identifying a charge loss duration, which may correspond with the period between determining the expected operational range and the subsequent corresponding travel, identifying a charge loss rate, and, determining the expected operational range using based on the charge loss rate and the charge loss duration. The charge loss rate may vary depending on the battery, environmental factors, such as the ambient temperature, or both. In some embodiments, the charge loss rate may be identified based on a charge loss profile, which may indicate charge loss rates for a range of temperatures.

Figure 14:
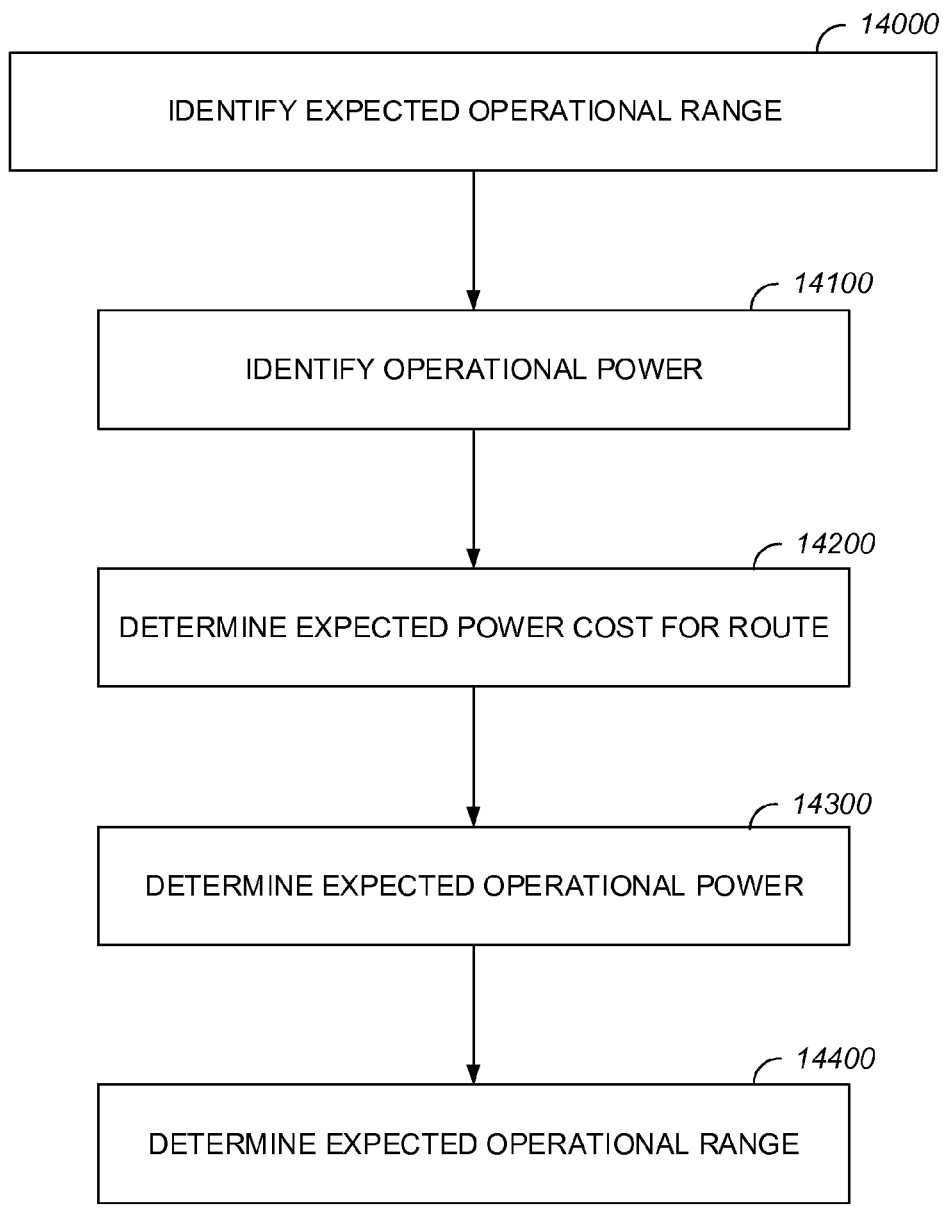
FIG. 14 is a diagram of another example of a method of identifying expected operational range information for electric vehicle range prediction in accordance with this disclosure.

FIG. 14 is a diagram of another example of a method of identifying expected operational range information for electric vehicle range prediction in accordance with this disclosure. In some embodiments, identifying expected operational range information 14000 for electric vehicle range prediction may be similar to the expected operational range information identification shown at 4300 in FIG. 4. Identifying expected operational range information 14000 for electric vehicle range prediction may be implemented in a portable electronic computing and communication device, such as the portable electronic computing and communication device 1100 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to perform expected operational range information identification 14000 for electric vehicle range prediction.

Implementations of identifying expected operational range information 14000 for electric vehicle range prediction may include identifying operational power at 14100, determining an expected power cost at 14200, determining a current expected operational power at 14300, determining the expected operational range at 14400, or a combination thereof.

In some embodiments, operational power may be identified at 14100. For example, the vehicle state information identified as shown at 5500 in FIG. 5 and as shown in FIG. 11 may indicate the current state of charge of the battery of the electric vehicle as a percentage of capacity, and identifying the operational power may include multiplying the current state of charge by the battery capacity, which may be expressed as unit energy, such as kilowatt-hours.

In some embodiments, an expected power cost may be determined at 14200. The expected power cost may be determined based on the route identified as shown at 5300 in FIG. 5 or as shown in FIG. 9, and may indicate an expected cost for the electric vehicle, driven by the user, to traverse the route in accordance with the departure temporal information identified as shown at 5400 in FIG. 5 or as shown in FIG. 10. In some embodiments, the expected power cost may be determined as a product of multiplying a spatial distance indicated by the route, which may be expressed in unit distance, such as miles or kilometers, by the expected efficiency value identified as shown at 4200 in FIG. 4 or as shown in FIG. 12.

In some embodiments, an expected operational power may be determined at 14300. The expected operational power may be expressed in units power, such as kilowatt-hours, and may indicate a predicted available power after traversing the route in accordance with the operational metrics identified as shown at 4100 in FIG. 4 or as shown in FIG. 5 and the efficiency information identified as shown at 5200 in FIG. 4 or as shown in FIG. 12. In some embodiments, the expected operational power may be determined as a difference between the current operational power identified at 14100 and the expected power cost identified at 14200.

In some embodiments, the expected operational range may be determined at 14400. For example, the expected operational range may be determined as a product of multiplying the expected operational power identified at 14300 by the expected efficiency value identified as shown at 5200 in FIG. 4 or a shown in FIG. 12. The expected operational range and may indicate an expected available operational range for the electric vehicle after traveling from a first location, such as a defined home location, to a second location, such as a defined work location.

FIG. 15 is a diagram of an example of a method of generating a user-specific efficiency profile for electric vehicle range prediction in accordance with this disclosure. In some embodiments, generating a user-specific efficiency profile 15000 for electric vehicle range prediction may be similar to generating a user-specific efficiency profile shown at 4600 in FIG. 4. Generating a user-specific efficiency profile 15000 for electric vehicle range prediction may be implemented in a portable electronic computing and communication device, such as the portable electronic computing and communication device 1100 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to generate a user-specific efficiency profile 15000 for electric vehicle range prediction. In some embodiments, generating a user-specific efficiency profile may include updating a user-specific efficiency profile.

Implementations of generating a user-specific efficiency profile 15000 for electric vehicle range prediction may include detecting a communication link at 15100, storing first user-specific efficiency information at 15200, traversing the vehicle transportation network at 15300, detecting a disconnection of the communication link at 15400, storing second user-specific efficiency information at 15500, or a combination thereof.

In some embodiments, a communication link may be detected at 15100. For example, the driver of the electric vehicle may turn on the electric vehicle, which may provide power to components of the electric vehicle, such as a short range wired or wireless electronic communication interface, which may be a Bluetooth interface, of the electric vehicle, the portable electronic computing and communication device may detect the availability of a direct electronic communication link, such as a Bluetooth link, with the electric vehicle, and the portable electronic computing and communication device may connect to the electric vehicle via the available link.

In some embodiments, first user-specific efficiency information may be stored at 15200. In some embodiments, storing the first user-specific efficiency information at 15200 may be performed in response to detecting the communication link at 15100. In some embodiments, storing the first user-specific efficiency information at 15200 may include confirming the location at 15210, identifying the vehicle state information at 15220, identifying the ambient temperature information at 15230, or a combination thereof.

In some embodiments, a current location of the electric vehicle may be confirmed at 15210. In some embodiments, identifying the current location of the electric vehicle at 15210 may include requesting the current location of the electric vehicle from the electric vehicle via the communication link, requesting the current location of the electric vehicle from an external communicating device, such as the communication device 3400 shown in FIG. 3, or identifying a current location of the portable electronic computing and communication device and using the current location of the portable electronic computing and communication device as the current location of the electric vehicle. For simplicity, the current location identified at 15210 may be referred to herein as the origin location.

In some embodiments, confirming the current location of the electric vehicle at 15210 may include determining whether a difference between the origin location of the electric vehicle and a defined location, such as a defined location identified as shown at 5100 in FIG. 5 or as shown in FIG. 7, which may be the defined home location or the defined work location, is within a geospatial proximity threshold. For example, the current location of the portable electronic computing and communication device, and the electric vehicle, may be geospatially proximate to the defined home location, and the current location may be confirmed as the origin location. In another example, the difference between the current location of the portable electronic computing and communication device may be geospatially distant from the defined home location, the defined work location, or any other defined location, and generating a user-specific efficiency profile for electric vehicle range prediction may be terminated or may include generating a defined location corresponding to the current location. In some embodiments, confirming the location at 15210 may include identifying one or more routes, such as the route identified as shown at 5300 in FIG. 5 or as shown in FIG. 9, that originate from the current location.

In some embodiments, current vehicle state information for the electric vehicle may be identified at 15220. In some embodiments, identifying the current vehicle state information for the electric vehicle at 15220 may be performed in response to determining that the distance between the current location of the electric vehicle and a defined location is within the proximity threshold at 15210. In some embodiments, identifying the current vehicle state information at 15220 may include requesting the current vehicle state information from the electric vehicle via the communication link, or requesting the current vehicle state information from an external communicating device, such as the communication device 3400 shown in FIG. 3. In some embodiments, identifying the current vehicle state information at 15220 may include identifying current odometer information for the electric vehicle, current state of charge information for a battery of the electric vehicle, current power capacity information for the battery of the electric vehicle, or a combination thereof.

In some embodiments, current ambient temperature information may be identified at 15230. In some embodiments, identifying the current ambient temperature information at 15230 may be performed in response to determining that the distance between the current location of the electric vehicle and a defined location is within the proximity threshold at 15210. In some embodiments, identifying the current ambient temperature information at 15230 may include requesting the current ambient temperature information from the electric vehicle via the communication link, requesting the current ambient temperature information from an external communicating device, such as the communication device 3400 shown in FIG. 3, or reading the current ambient temperature from a memory of the portable electronic computing and communication device.

In some embodiments, storing the first user-specific efficiency information at 15200 may include storing information indicating the user, information indicating the electric vehicle, information indicating a current trip, current temporal information, the current vehicle state information identified at 15220, the current ambient temperature information identified at 15230, or a combination thereof. For example, the information indicating the user may include a user identifier, the information indicating the electric vehicle may include a vehicle identifier, the information indicating a current trip may indicate a route, such as the route identified as shown at 5300 in FIG. 5 or as shown in FIG. 9, the current vehicle state information may include odometry information, vehicle state of charge information, or both, identified at 15220, and the current ambient temperature information may include the current ambient temperature information identified at 15230.

The electric vehicle may traverse a portion of the vehicle transportation network at 15300. For example, the electric vehicle may traverse the vehicle transportation network from the defined home location to the defined work location. Traversing the vehicle transportation network at 15300 may be performed temporally proximate to confirming the current vehicle location at 15210, identifying the current vehicle state information at 15220, and identifying the current ambient temperature information at 15230.

In some embodiments, a disconnection of the communication link may be detected at 15400. For example, the driver of the electric vehicle may turn the electric vehicle off, which may interrupt power to components of the electric vehicle, such as the short range wired or wireless electronic communication interface, and the portable electronic computing and communication device may detect that the electronic communication link is unavailable or disconnected.

In some embodiments, second user-specific efficiency information may be stored at 15500. Storing the second user-specific efficiency information at 15500 may be performed in response to detecting the disconnection of the communication link at 15400. In some embodiments, storing the second user-specific efficiency information at 15500 may include confirming the current vehicle location at 15510, identifying the current vehicle state information at 15520, determining a user-specific current efficiency value at 15530, storing a user-specific efficiency profile at 15540, or a combination thereof.

In some embodiments, a current location of the electric vehicle may be confirmed at 15510. In some embodiments, confirming the current location of the electric vehicle at 15510 may include requesting the current location of the electric vehicle from an external communicating device, such as the communication device 3400 shown in FIG. 3, or identifying a current location of the portable electronic computing and communication device and using the current location of the portable electronic computing and communication device as the current location of the electric vehicle. For simplicity, the current location identified at 15510 may be referred to herein as the destination location.

In some embodiments, confirming the current location of the electric vehicle at 15510 may include determining whether a difference between the current location of the electric vehicle and a defined location, such as a defined location identified as shown at 5100 in FIG. 5 or as shown in FIG. 7, which may be the defined home location or the defined work location, is within a geospatial proximity threshold, and may include determining whether the destination location identified at 15510 differs from the origin location identified at 15210.

For example, the origin location may be geospatially proximate to the defined home location and confirming the current location of the electric vehicle at 15510 may include determining whether the destination location is geospatially proximate the defined work location. In another example, the origin location may be geospatially proximate to the defined work location and confirming the current location of the electric vehicle at 15510 may include determining whether the destination location is geo spatially proximate the defined home location.

In some embodiments, current vehicle state information for the electric vehicle may be identified at 15520. In some embodiments, identifying the current vehicle state information at 15520 may include requesting the current vehicle state information from an external communicating device, such as the communication device 3400 shown in FIG. 3. In some embodiments, identifying the current vehicle state information at 15520 may include identifying current odometer information for the electric vehicle and current state of charge information for a battery of the electric vehicle.

In some embodiments, storing the second user-specific efficiency information at 15500 may include storing information indicating the user, information indicating the electric vehicle, information indicating the current trip, current temporal information, the current vehicle state information identified at 15520, or a combination thereof. In some embodiments, the information indicating the current trip may include geospatial distance information indicating a distance traveled by the electric vehicle for the trip as a determined route distance. The determined route distance may be identified based on a difference between the odometer information identified at 15520 and the odometer information identified at 15220. In some embodiments, storing the second user-specific efficiency information at 15500 may include confirming the route identified at 15210. For example, confirming the route may include determining whether a difference between the determined route distance and an expected route distance, which may be a distance calculated for the route based on the vehicle transportation network information, is within a route variance threshold.

In some embodiments, a user-specific current efficiency value may be determined at 15530. For example, the user-specific current efficiency value may be determined based on the origin vehicle state information identified at 15220, the destination vehicle state information identified at 15520, and the determined route distance. In some embodiments, determining the user-specific current efficiency value may include determining an operational cost for the trip. In some embodiments, determining the operational cost for the trip may include determining difference between the destination state of charge identified at 15520 and the origin state of charge identified at 15220. In some embodiments, determining the operational cost for the trip may include determining a product of the power capacity of the electric vehicle identified at 15220 and the difference between the destination state of charge identified at 15520 and the origin state of charge identified at 15220 as the operational cost. In some embodiments, determining the user-specific current efficiency value may include determining a quotient of dividing the operational cost by the determined route distance as the user-specific current efficiency value. For example, the power capacity may indicate a current maximum capacity of the battery in units power, such as in kilowatt-hours, temporally proximate with detecting the electronic communication link at 15100, the operational cost may indicate a cost, in units power, utilized by the electric vehicle, driven by the user, to traverse the vehicle transportation network from the origin to the destination beginning temporally proximate with detecting the electronic communication link at 15100, and the user-specific current efficiency value may indicate a corresponding measure of the efficiency of the electric vehicle, which may be expressed in units power per unit distance, such as in kilowatt-hours per mile.

In some embodiments, storing the first user-specific efficiency information at 15200, storing the second user-specific efficiency information at 15500, or both, may include storing the user-specific efficiency information in temperature order based on the origin ambient temperature identified at 15230. In some embodiments, the temperature information may be quantized temperature information, such as temperature information quantized to the nearest degree. In some embodiments, multiple user-specific efficiency information records having the same temperature may be ordered temporally.

In some embodiments, a user-specific efficiency profile may be stored at 15540. In some embodiments, storing the user-specific efficiency profile at 15540 may include identifying a user-specific efficiency profile associated with the user and the electric vehicle. In some embodiments, identifying the user-specific efficiency profile may include generating the user-specific efficiency profile.

In some embodiments, storing the user-specific efficiency profile at 15540 may include incorporating the user-specific current efficiency value determined at 15530 in the user-specific efficiency profile. For example, the ambient temperature identified at 15230 may be 28 degrees, the user-specific efficiency information may include an efficiency value of 1.6, and information indicating an efficiency value of 1.6 at a temperature of 28 degrees may be included in the user-specific efficiency profile as represented by the diamond 17000 shown in FIG. 17.

In some embodiments, storing the user-specific efficiency profile at 15540 may include identifying a moving average trend line for the user-specific efficiency profile. For example, a user-specific efficiency profile may include a scattered data plot of multiple efficiency values, may include a moving average trend line representing an aggregation of the efficiency values, or both. In some embodiments, an interpolated efficiency value may be identified based on an efficiency profile. For example, an efficiency profile may omit an efficiency value for a target ambient temperature, and an interpolated efficiency value may be identified for the target ambient temperature based on the moving average trend line, or based on other efficiency values included in the efficiency profile, such as efficiency values within a defined ambient temperature range preceding the target ambient temperature. In some embodiments, storing the user-specific efficiency profile at 15540 may include incorporating the user-specific current efficiency value determined at 15530 in the user-specific efficiency profile by updating the moving average trend line based on the user-specific current efficiency value.

FIGS. 16 and 17 show examples of efficiency profiles. An efficiency profile may represent efficiency values for operating the electric vehicle over a range of ambient temperatures as a scattered data plot, and may include a moving average trend line representing an aggregation of the corresponding efficiency values. An efficiency profile may be associated with an electric vehicle type, which may indicate a make, a model, a model year, one or more model options or features, or a combination thereof. Although the efficiency profile examples shown in FIGS. 16 and 17 are described in relation to kilowatt-hours per mile and in temperature Fahrenheit, any unit energy, unit spatial distance, and unit temperature may be used.

FIG. 16 is a diagram of an example of a defined efficiency profile for electric vehicle range prediction in accordance with this disclosure. A defined efficiency profile may indicate calculated or predicted efficiency information for a fictive or average user of an electric vehicle, such as the electric vehicle shown in FIG. 2. In some embodiments, the defined efficiency profile may be based on efficiency values determined for multiple users of similar vehicles. As shown in FIG. 16, a defined efficiency profile may indicate defined expected efficiency values. For example, as shown in FIG. 16, the defined expected efficiency value for the electric vehicle at 25 degrees Fahrenheit is approximately 1.5 kilowatts per mile. In FIG. 16 representations of individual defined efficiency values are omitted for simplicity.

FIG. 17 is a diagram of an example of a user-specific efficiency profile for electric vehicle range prediction in accordance with this disclosure. A user-specific efficiency profile may include determined efficiency information for the user driving the electric vehicle. In some embodiments, a user-specific efficiency profile may indicate a user-specific expected efficiency value for operating the electric vehicle at various ambient temperatures. In FIG. 17 a moving average trend line representing defined efficiency profile information is shown as a solid line, determined user-specific efficiency values, such as the user-specific efficiency value determined as shown at 15530 in FIG. 15, are shown as diamonds, and a moving average trend line of the user-specific efficiency profile information is shown as a broken line. Representations of individual defined efficiency values are omitted for simplicity.

In some embodiments, electric vehicle range prediction may include using an expected user-specific efficiency value. For example, the user-specific efficiency profile includes user-specific efficiency values proximate to the ambient temperature of 25 degrees Fahrenheit, and an expected user-specific efficiency value may be identified for the ambient temperature of 25 degrees Fahrenheit and used for electric vehicle range prediction. In some embodiments, the expected user-specific efficiency value may be an interpolated value.

In some embodiments, determined user-specific efficiency values proximate to a target ambient temperature may be unavailable and an efficiency value for the target ambient temperature may be identified based on the defined efficiency profile. For example, as shown in FIG. 17, the user-specific efficiency profile omits determined user-specific efficiency values proximate to the ambient temperature of 90 degrees Fahrenheit, and an efficiency value for the ambient temperature of 90 degrees Fahrenheit from the defined efficiency profile may be used for electric vehicle range prediction.

FIG. 18 is a diagram of an example of user interface for electric vehicle range prediction in accordance with this disclosure. In some embodiments, a user interface 18000 for electric vehicle range prediction may be implemented in a portable electronic computing and communication device, such as the portable electronic computing and communication device 1100 shown in FIG. 1, an electric vehicle, such as the electric vehicle 2000 shown in FIG. 2 or the electric vehicle 3100 shown in FIG. 3, or a combination thereof. For example, the processor 1020 of the portable electronic computing and communication device 1000 shown in FIG. 1 may execute instructions stored on the memory 1030 of the portable electronic computing and communication device 1000 shown in FIG. 1 to generate and present a user interface 18000 for electric vehicle range prediction.

In some embodiments, the user interface 18000 may present information for a series of one or more trips, such as a trip from home to work and a subsequent trip from work to home. In the example shown in FIG. 18, the user interface 18000 includes information 18100 for a trip from home to work, information 18200 for a subsequent trip from work to home, and information 18300 for a trip home from work that includes traveling to an intermediate location. The information 18300 for the trip including the intermediate location may include a first portion 18310 from work to the intermediate location, and a subsequent second portion 18320, for traveling home from the intermediate location.

The information 18100 shown for traversing the vehicle transportation network from the defined home location identified as shown at 5100 in FIG. 5 or as shown in FIG. 7 to the defined work location identified as shown at 5100 in FIG. 5 or as shown in FIG. 7, in accordance with the corresponding route identified as shown at 5300 in FIG. 5 or as shown in FIG. 9, the corresponding predicted ambient temperature identified as shown at 5400 in FIG. 5 or as shown in FIG. 10, and the corresponding vehicle state information identified as shown at 5500 in FIG. 5 or as shown in FIG. 11, may include the estimated spatial distance for the route 18110, the current state of charge of the battery of the electric vehicle before traversing the route 18120, the estimated ambient temperature for the route in accordance with the expected departure temporal information 18130, the expected operational range from the work location 18140, or a combination thereof.

The information 18200 shown for traversing, subsequent to traversing the vehicle transportation network from the defined home location to the defined work location, the vehicle transportation network from the defined work location to the defined home location, in accordance with the corresponding route identified as shown at 5300 in FIG. 5 or as shown in FIG. 9, the corresponding predicted ambient temperature identified as shown at 5400 in FIG. 5 or as shown in FIG. 10, and the first expected operational range shown at 18140, may include the estimated spatial distance for the route 18210, the estimated ambient temperature for the route in accordance with the expected departure temporal information 18220, the expected operational range from home 18230, or a combination thereof.

The information 18300 shown for traversing, subsequent to traversing the vehicle transportation network from the defined home location to the defined work location, the vehicle transportation network from the defined work location to a defined intermediate location, in accordance with the corresponding route identified as shown at 5300 in FIG. 5 or as shown in FIG. 9, the corresponding predicted ambient temperature identified as shown at 5400 in FIG. 5 or as shown in FIG. 10, and the first expected operational range, and subsequently traversing the vehicle transportation network from the defined intermediate location to the defined home location, in accordance with the corresponding route identified as shown at 5300 in FIG. 5 or as shown in FIG. 9, the corresponding predicted ambient temperature identified as shown at 5400 in FIG. 5 or as shown in FIG. 10, and the first expected operational range shown at 18140, may include a first portion 18310, which may include the estimated spatial distance for the route from work to the intermediate location, the corresponding estimated ambient temperature, the expected operational range from the intermediate location, and a second portion 18320, which may include the estimated spatial distance for the route from the intermediate location to the defined home location, the corresponding estimated ambient temperature, and the expected operational range from the defined home location.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method of generating a user-specific efficiency profile for an electric vehicle, the method comprising:
   in response to detecting, by a portable electronic computing and communication device, a first direct electronic communication link between the portable electronic computing and communication device and an electric vehicle, storing, in a memory of the portable electronic computing and communication device, first user-specific efficiency information associated with the electric vehicle and associated with a current user of the portable electronic computing and communication device, wherein storing the first user-specific efficiency information includes:
   identifying a first current location, and
   storing one or more of a user identifier indicating the current user, a vehicle identifier indicating the electric vehicle, the first current location, first current vehicle state information, a first current ambient temperature, or first current temporal information; and
   in response to detecting, by the portable electronic computing and communication device, a disconnection of the first direct electronic communication link, storing, in the memory, second user-specific efficiency information associated with the current user and associated with the electric vehicle, wherein storing the second user-specific efficiency information includes:
   identifying a second current location,
   determining a current efficiency value based on the first user-specific efficiency information and the second user-specific efficiency information, and
   storing a user-specific efficiency profile incorporating the current efficiency value.

2. The method of claim 1, wherein storing the first user-specific efficiency information includes:
   storing the first user-specific efficiency information on a condition that a difference between the first current location and a first identified location is within a first geospatial proximity threshold.

3. The method of claim 1, wherein storing the first user-specific efficiency information includes:
   identifying the first current location, wherein the first current location indicates a current location of the portable electronic computing and communication device, temporally proximate to detecting the first direct electronic communication link.

4. The method of claim 3, wherein identifying the first current location includes:
- generating, by the portable electronic computing and communication device, a first location request;
- transmitting the first location request to an external communicating device via an electronic computer communication link;
- in response to transmitting the first location request, receiving, from the external communicating device, first current location information indicating the first current location.

5. The method of claim 1, wherein storing the first user-specific efficiency information includes:
- identifying the first current vehicle state information, the first current vehicle state information indicating one or more of a first current state of charge of a battery of the electric vehicle or first current odometry information for the electric vehicle, temporally proximate to detecting the first direct electronic communication link.

6. The method of claim 5, wherein identifying the first current vehicle state information includes:
- generating a first vehicle state information request indicating the electric vehicle;
- outputting the first vehicle state information request to an external communicating device via an electronic computer communication link; and
- in response to outputting the first vehicle state information request, receiving a response indicating the first current vehicle state information from the external communicating device.

7. The method of claim 1, wherein storing the first user-specific efficiency information includes:
- identifying the first current ambient temperature, wherein the first current ambient temperature indicates a current ambient temperature for the first current location, temporally proximate to detecting the first direct electronic communication link.

8. The method of claim 7, wherein identifying the first current ambient temperature includes:
- generating a first ambient temperature information request indicating the first current location;
- outputting the first ambient temperature information request to an external communicating device via an electronic computer communication link; and
- in response to outputting the first ambient temperature information request, receiving a response indicating the first current ambient temperature from the external communicating device.

9. The method of claim 1, wherein storing the second user-specific efficiency information includes:
- storing the second user-specific efficiency information on a condition that a difference between the second current location and a second identified location is within a second geospatial proximity threshold.

10. The method of claim 1, wherein storing the second user-specific efficiency information includes:
- storing one or more of the user identifier indicating the current user, the vehicle identifier identifying the electric vehicle, the second current location, second current vehicle state information, or second current temporal information.

11. The method of claim 10, wherein storing the second user-specific efficiency information includes:
- identifying the second current location, wherein the second current location indicates a current location of the portable electronic computing and communication device, temporally proximate to detecting the disconnection.

12. The method of claim 11, wherein identifying the second current location includes:
- generating, by the portable electronic computing and communication device, a second location request;
- transmitting the second location request to an external communicating device via an electronic computer communication link;
- in response to transmitting the second location request, receiving, from the external communicating device, second current location information indicating the second current location.

13. The method of claim 10, wherein storing the second user-specific efficiency information includes:
- identifying the second current vehicle state information, the second current vehicle state information indicating one or more of a second current state of charge of the battery or second current odometry information for the electric vehicle, temporally proximate to detecting the disconnection.

14. The method of claim 13, wherein identifying the second current vehicle state information includes:
- generating a second vehicle state information request indicating the electric vehicle;
- outputting the second vehicle state information request to an external communicating device via an electronic computer communication link; and
- in response to outputting the second vehicle state information request, receiving a response indicating the second current vehicle state information from the external communicating device.

15. The method of claim 10, wherein storing the second user-specific efficiency information includes:
- identifying vehicle transportation network information representing a vehicle transportation network, the vehicle transportation network including the first current location and the second current location;
- identifying a route from the first current location to the second current location in the vehicle transportation network using the vehicle transportation network information; and
- storing the second user-specific efficiency information in response to the electric vehicle traversing the vehicle transportation network from the first current location to the second current location using the route, wherein storing the second user-specific efficiency information includes storing route information representing the route.

16. The method of claim 10, wherein the first current vehicle state information includes a first odometry value, the second current vehicle state information includes a second odometry value, and wherein storing the second user-specific efficiency information includes:
- storing a difference between the second odometry value and the first odometry value as a determined route distance.

17. The method of claim 16, wherein the first current vehicle state information includes a first current state of charge of a battery of the electric vehicle, temporally proximate to detecting the first direct electronic communication link, the second current vehicle state information includes a second current state of charge of the battery of the electric vehicle, temporally proximate to detecting the disconnection, and wherein determining the current efficiency value includes:

determining an operational cost as a product of a power capacity of the electric vehicle and a difference between the second current state of charge and the first current state of charge; and determining the current efficiency value as a quotient of the operational cost and the determined route distance.

18. The method of claim 17, wherein storing the second user-specific efficiency information includes:

identifying, from the user-specific efficiency profile, a user-specific aggregate efficiency value corresponding to the current ambient temperature;

generating an updated user-specific aggregate efficiency value based on the user-specific aggregate efficiency value and the current efficiency value; and updating the user-specific efficiency profile to include the updated user-specific aggregate efficiency value.

19. A method of generating a user-specific efficiency profile for an electric vehicle, the method comprising:

in response to detecting, by a portable electronic computing and communication device, a first direct electronic communication link between the portable electronic computing and communication device and an electric vehicle, storing, in a memory of the portable electronic computing and communication device, first user-specific efficiency information associated with the electric vehicle and associated with a current user of the portable electronic computing and communication device, wherein storing the first user-specific efficiency information includes:

identifying a first current location, wherein the first current location indicates a current location of the portable electronic computing and communication device, temporally proximate to detecting the first direct electronic communication link, identifying first current vehicle state information, the first current vehicle state information indicating one or more of a first current state of charge of a battery of the electric vehicle or first current odometry information for the electric vehicle, temporally proximate to detecting the first direct electronic communication link, identifying a first current ambient temperature, wherein the first current ambient temperature indicates a current ambient temperature for the first current location, temporally proximate to detecting the first direct electronic communication link, and storing one or more of a user identifier indicating the current user, a vehicle identifier indicating the electric vehicle, the first current location, the first current vehicle state information, the first current ambient temperature, or first current temporal information; and in response to detecting, by the portable electronic computing and communication device, a disconnection of the first direct electronic communication link, storing, in the memory, second user-specific efficiency information associated with the current user and associated with the electric vehicle, wherein storing the second user-specific efficiency information includes:

identifying a second current location, wherein the second current location indicates a current location of the portable electronic computing and communication device, temporally proximate to detecting the disconnection, identifying second current vehicle state information, the second current vehicle state information indicating one or more of a second current state of charge of the battery or second current odometry information for the electric vehicle, temporally proximate to detecting the disconnection, determining a current efficiency value based on the first user-specific efficiency information and the second user-specific efficiency information, storing one or more of the user identifier indicating the current user, the vehicle identifier identifying the electric vehicle, the second current location, the second current vehicle state information, or second current temporal information, and storing a user-specific efficiency profile incorporating the current efficiency value.

20. The method of claim 19, wherein storing the first user-specific efficiency information includes:

identifying vehicle transportation network information representing a vehicle transportation network, the vehicle transportation network including a first identified location and a second identified location;

storing the first user-specific efficiency information on a condition that a difference between the first current location and a first identified location is within a first proximity threshold; and wherein storing the second user-specific efficiency information includes:

storing the second user-specific efficiency information a condition that a difference between the second current location and a second identified location is within a second proximity threshold.

21. The method of claim 19, wherein storing the second user-specific efficiency information includes:

determining a difference between the second current odometry information and the first current odometry information as a determined route distance;

determining an operational cost as a product of a power capacity of the electric vehicle and a difference between the second current state of charge and the first current state of charge; and determining the current efficiency value as a quotient of the operational cost and the determined route distance.

22. A method of generating a user-specific efficiency profile for an electric vehicle, the method comprising:

in response to detecting, by a portable electronic computing and communication device, a first direct electronic communication link between the portable electronic computing and communication device and an electric vehicle, storing, in a memory of the portable electronic computing and communication device, first user-specific efficiency information associated with the electric vehicle and associated with a current user of the portable electronic computing and communication device, wherein storing the first user-specific efficiency information includes:

identifying a first current location, and storing one or more of a user identifier indicating the current user, a vehicle identifier indicating the electric vehicle, the first current location, first current vehicle state information, a first current ambient temperature, or first current temporal information; and in response to detecting, by the portable electronic computing and communication device, a disconnection of the first direct electronic communication link, storing, in the memory, second user-specific efficiency information associated with the current user and associated with the electric vehicle, wherein storing the second user-specific efficiency information includes:

identifying a second current location, determining a current efficiency value based on the first user-specific efficiency information and the second user-specific efficiency information, identifying, from a user-specific efficiency profile associated with the user and the electric vehicle, a user-specific aggregate efficiency value corresponding to the current ambient temperature, generating an updated user-specific aggregate efficiency value based on the user-specific aggregate efficiency value and the current efficiency value, updating the user-specific efficiency profile to include the updated user-specific aggregate efficiency value, and storing the user-specific efficiency profile.

* * * * *